US010862163B2

(12) United States Patent
Fenton et al.

(10) Patent No.: US 10,862,163 B2
(45) Date of Patent: Dec. 8, 2020

(54) ORGANOSILICON-BASED ELECTROLYTES FOR LONG-LIFE LITHIUM PRIMARY BATTERIES

(71) Applicant: National Technology & Engineering Solutions of Sandia, LLC-, Albuquerque, NM (US)

(72) Inventors: Kyle R. Fenton, Albuquerque, NM (US); Ganesan Nagasubramanian, Albuquerque, NM (US); Chad Staiger, Albuquerque, NM (US); Harry Pratt, Albuquerque, NM (US); Kevin Leung, Albuquerque, NM (US); Susan Rempe, Albuquerque, NM (US); Mangesh Chaudhari, Albuquerque, NM (US); Travis Mark Anderson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 573 days.

(21) Appl. No.: 15/409,845

(22) Filed: Jan. 19, 2017

(65) Prior Publication Data
US 2017/0207485 A1  Jul. 20, 2017

Related U.S. Application Data

(60) Provisional application No. 62/280,744, filed on Jan. 20, 2016.

(51) Int. Cl.
*H01M 10/0564* (2010.01)
*H01M 2/14* (2006.01)
(Continued)

(52) U.S. Cl.
CPC ....... *H01M 10/0564* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

2007/0065728 A1* 3/2007 Zhang ................... H01M 4/134
429/326
2012/0183866 A1* 7/2012 Lee .......................... C07F 5/025
429/332

OTHER PUBLICATIONS

Rossi, N.A.A. et al., "Silicon-Containing Liquid Polymer Electrolytes for Application in Lithium Ion Batteries", Polym Int, 2009, pp. 267-272, vol. 58.
(Continued)

*Primary Examiner* — Christopher P Domone
(74) *Attorney, Agent, or Firm* — Kevin W. Bieg

(57) ABSTRACT

Organosilicon electrolytes exhibit several important properties for use in lithium carbon monofluoride batteries, including high conductivity/low viscosity and thermal/electrochemical stability. Conjugation of an anion binding agent to the siloxane backbone of an organosilicon electrolyte creates a bi-functional electrolyte. The bi-functionality of the electrolyte is due to the ability of the conjugated polyethylene oxide moieties of the siloxane backbone to solvate lithium and thus control the ionic conductivity within the electrolyte, and the anion binding agent to bind the fluoride anion and thus facilitate lithium fluoride dissolution and preserve the porous structure of the carbon monofluoride cathode. The ability to control both the electrolyte conductivity and the electrode morphology/properties simultaneously can improve lithium electrolyte operation.

5 Claims, 23 Drawing Sheets

(51) Int. Cl.
    H01M 4/133    (2010.01)
    H01M 10/0525  (2010.01)
    H01M 4/134    (2010.01)
    H01M 4/38     (2006.01)
    H01M 10/052   (2010.01)
    H01M 4/583    (2010.01)

(52) U.S. Cl.
    CPC ......... H01M 4/385 (2013.01); H01M 4/5835 (2013.01); H01M 10/052 (2013.01); *H01M 2300/0037* (2013.01)

(56) References Cited

OTHER PUBLICATIONS

Zhang, L. et al., "Highly Conductive Trimethylsilyl Oligo(Ethylene Oxide) Electrolytes for Energy Storage Applications", Journal of Materials Chemistry, 2008, pp. 3713-3717, vol. 18.

Zhang, Z. et al., "Sythesis and Ionic Conductivity of Mixed Substituted Polysiloxanes with Oligoethyleneoxy and Cyclic Carbonate Substituents", Silicon Chemistry, 2005, pp. 259-266, vol. 3.

Lee, H. S. et al., "Synthesis of a New Family of Fluoride Boronate Compounds as Anion Receptors and Studies of Their Use as Additives in Lithium Battery Electrolytes", Journal of Power Sources, 2001, pp. 566-569, vol. 97-98.

Sun, X. et al., "A New Additive for Lithium Battery Electrolytes Based on an Alkyl Borate Compound", Journal of the Electrochemical Society, 2002, pp. A355-A359, vol. 149.

Zhang, Z. et al., "Oligo(Ethylen Glycol)-Functionalized Disiloxanes as Electrolytes for Lithium-Ion Batteries", Journal of Power Sources, 2010, pp. 6062-6068, vol. 195.

Reddy, V. P. et al., "Boron-Based Anion Receptors in Lithium-Ion and Metal-Air Batteries", Journal of Power Sources, 2014, pp. 813-820, vol. 247.

Sun, X. et al., "A Novel Lithium Battery Electrolyte Based on Lithium Fluoride and a Tris(pentafluorophenyl) Borane Anion Receptor in DME", Electrochemical and Solid-State Letters, 1998, pp. 239-240, vol. 1.

Lee, H. S. et al., "The Synthesis of a New Family of Boron-Based Anion Receptors and the Study of Their Effect on Ion Pair Dissociation and Conductivity of Lithium Salts in Nonaqueous Solutions", J Electrochem. Soc., 1998, pp. 2813-2818, vol. 145.

Nair, N. G. et al., "Fluorinated Boroxin-Based Anion Receptors for Lithium Ion Batteries: Fluoride Anion Binding, Ab Initio Calculations, and Ionic Conductivity Studies", J. Phys Chem. 2009, pp. 5918-5926, vol. 113.

Qin, Y. et al., "Effect of Anion Receptor Additives on Electrochemical Performance of Lithium-Ion Batteries", J. Phys. Chem. 2010, pp. 15202-15206, vol. 114.

Chen, Z. et al., "Computational Estimates of Fluoride Affinity of Boron-Based Anion Receptors", Journal of the Electrochemical Society, 2009, pp. A672-A676, vol. 156.

Li, L.F. et al., "A Pentafluorophenylboron Oxalate Additive in Non-Aqueous Electrolytes for Lithium Batteries", Electrochemsitry Communications, 2009, pp. 2296-2299, vol. 11.

Zhu, Y. et al., "Mitigating Performance Degradation of High-Capacity Lithium-Ion Cells with Boronate-Based Electrolyte Additives", Journal of the Electrochemical Society, 2014, pp. A1580-A1585, vol. 161.

Choi, N-S. et al., "Effect of Tris(Methoxy Diethylene Glycol) Borate on Ionic Conductivity and Electrochemical Stability of Ethylene Carbonate-Based Electrolyte", Electrochimica Acta, 2008, pp. 6575-6579, vol. 53.

Rangasamy, E. et al., "Pushing the Theoretical Limit of Li-CFx Batteries: A Tale of Bifunctional Electrolyte", Journal of the American Chemical Society, 2014, pp. 6874-6877, vol. 136.

Shanmukaraj, D. et al., "Boron Esters as Tunable Anion Carriers for Non-Aqueous Batteries Electrochemistry", Journal of American Chemical Society, 2010, pp. 3055-3062, vol. 132.

* cited by examiner

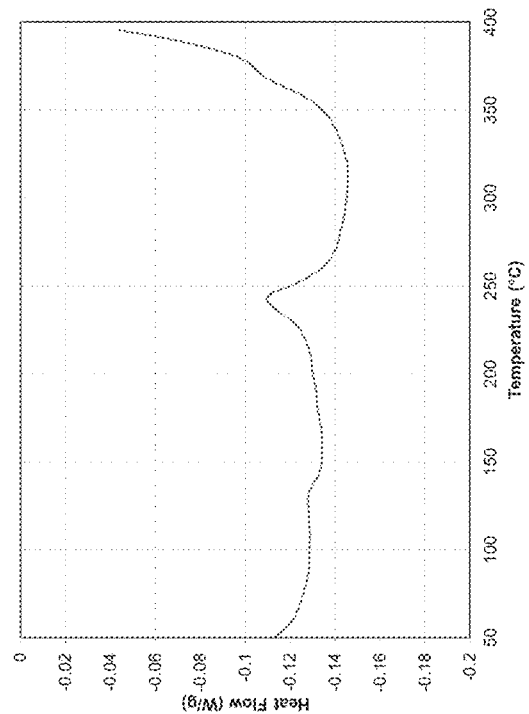
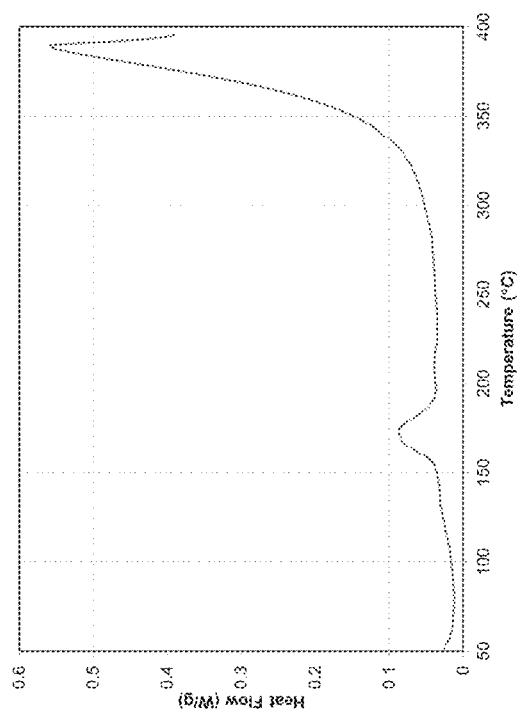
FIG. 10A
FIG. 10B

US 10,862,163 B2

ORGANOSILICON-BASED ELECTROLYTES FOR LONG-LIFE LITHIUM PRIMARY BATTERIES

CROSS-REFERENCE TO RELATED APPLICATION

This application claims the benefit of U.S. Provisional Application No. 62/280,744, filed Jan. 20, 2016, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to lithium battery technology and, in particular, to organosilicon-based electrolytes for long-life lithium primary batteries.

BACKGROUND OF THE INVENTION

Many current systems employ lithium primary batteries due to their high energy densities and wide operational temperature range. However, many of these systems are deficient when it comes to chemical safety or electrochemical utilization of the cathode material. In particular, many of the lithium carbon monofluoride ($CF_x$) batteries that are currently employed do not use all of the available capacity of the electrochemical couple. Since the carbon monofluoride system uses a solid cathode (unlike the $SO_2$ or $SOCl_2$ systems), the performance increase depends solely on the electrolyte.

In FIG. 1 is shown a schematic illustration of a simple lithium carbon monofluoride ($LiCF_x$) battery. The anode can be lithium metal. The porous carbon monofluoride cathode material can be formed by high-temperature intercalation of fluorine gas into graphite powder. The separator component of the cell acts as both a physical insulator between the anode and cathode, and as an electrolyte absorbent which maintains the desired ionic conductivity in the cell. The electrolyte itself is the ionic conductor within the cell. A lithium tetrafluoroborate ($LiBF_4$) salt in a solution of propylene carbonate and dimethoxyethane (PC and DME) is typically used as an electrolyte in a lithium carbon monofluoride coin cell battery. During discharge, lithium metal is oxidized at the anode, providing electrons to the external circuit. A cathode current collector receives the electrons from the external circuit which combine with lithium cations moving through the separator and the electrolyte. The reaction products lithium fluoride (LiF) and amorphous carbon (C) form at the cathode according to the overall reaction $CF_x+xLi\rightarrow C+xLiF$.

SUMMARY OF THE INVENTION

The present invention is directed to a lithium battery, comprising an anode comprising lithium metal; a cathode comprising carbon monofluoride; a separator between the anode and the cathode; and an organosilicon-based electrolyte for conducting lithium ions between the anode and the cathode, the electrolyte comprising a siloxane or silane backbone and an anion binding agent ligand bonded to the siloxane or silane backbone. The anion binding agent preferably comprises a boron-based ligand, such as a pentafluorophenylboron. The organosilicon-based electrolytes provide increased primary battery safety while offering electrochemical performance increases.

BRIEF DESCRIPTION OF THE DRAWINGS

The detailed description will refer to the following drawings, wherein like elements are referred to by like numbers.

FIG. 10A is a DSC graph of the siloxane-linked ABA material. FIG. 10B is a DSC graph of the liquid-phase fluorous ABA.

ABA21, and (F) ABAT, all bonded to an F⁻. Boron atoms are sp³ hybridized in tetrahedral-like geometries.

Figure 18A:
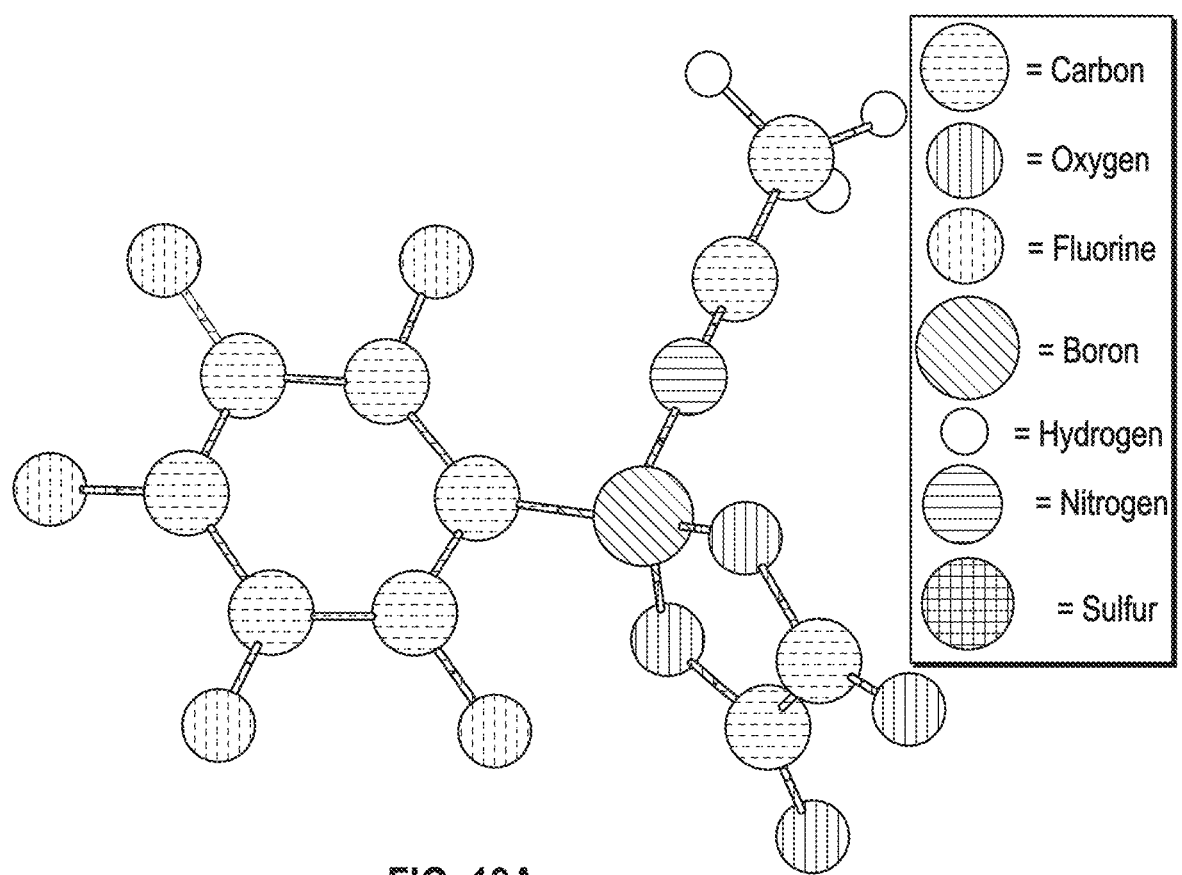
Figure 18B:
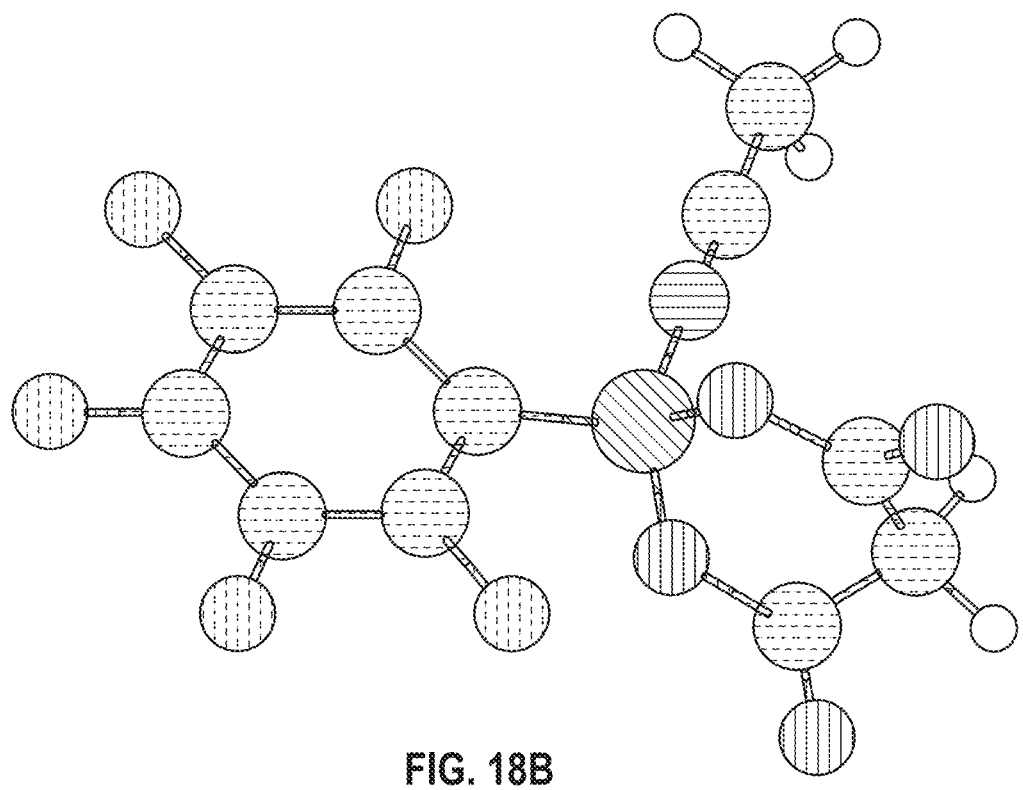
Figure 18C:
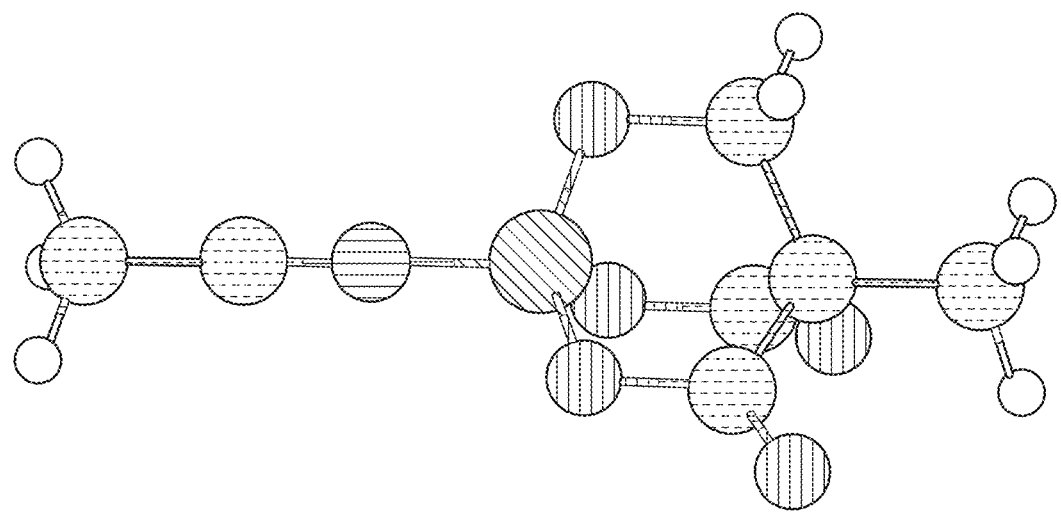
Figure 18D:
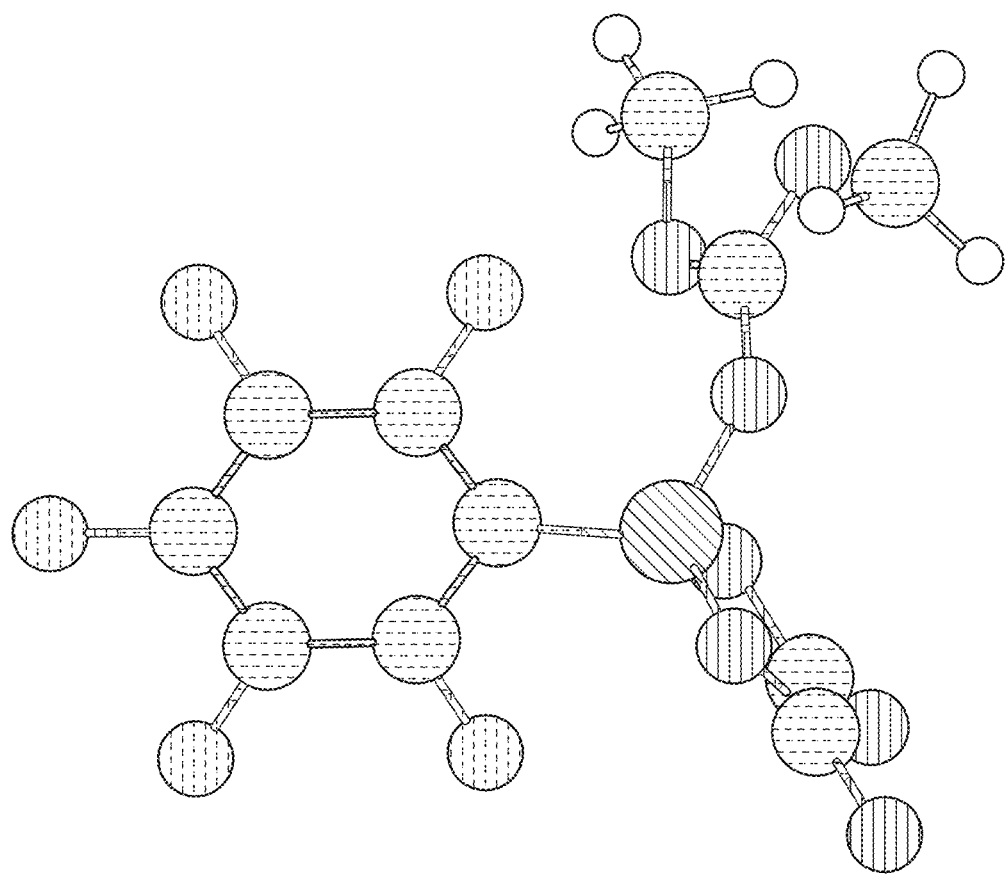
Figure 18E:
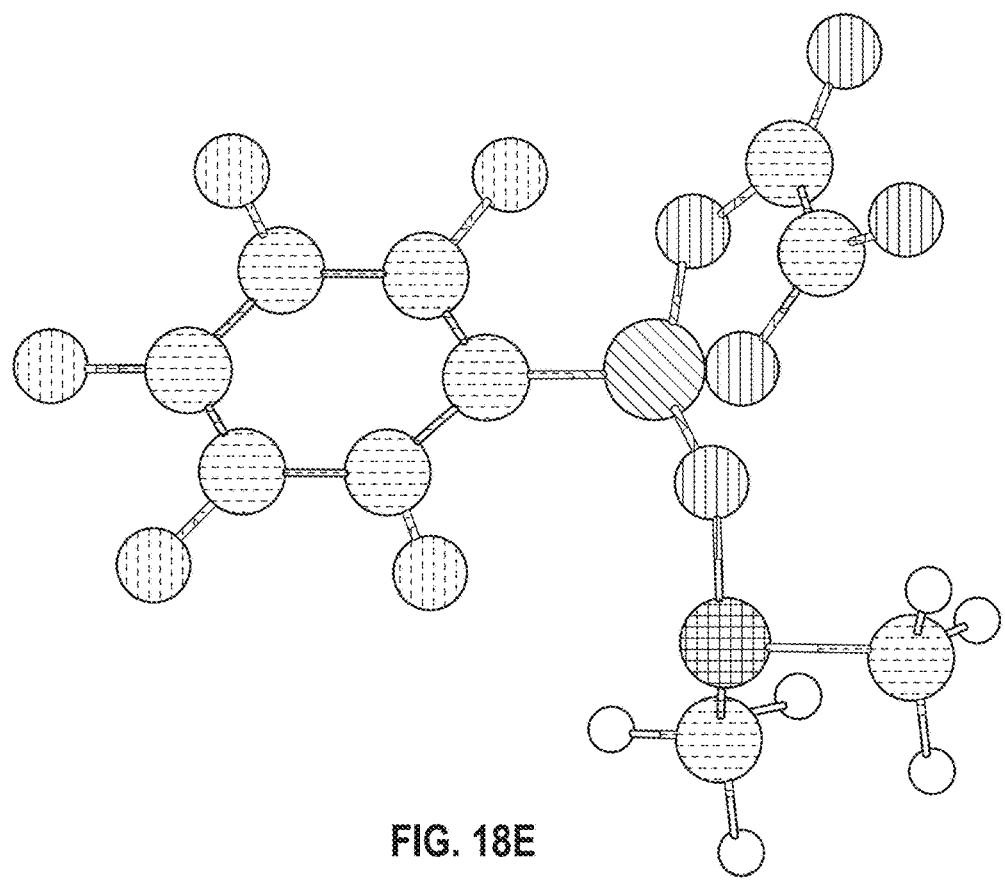
Figure 18F:
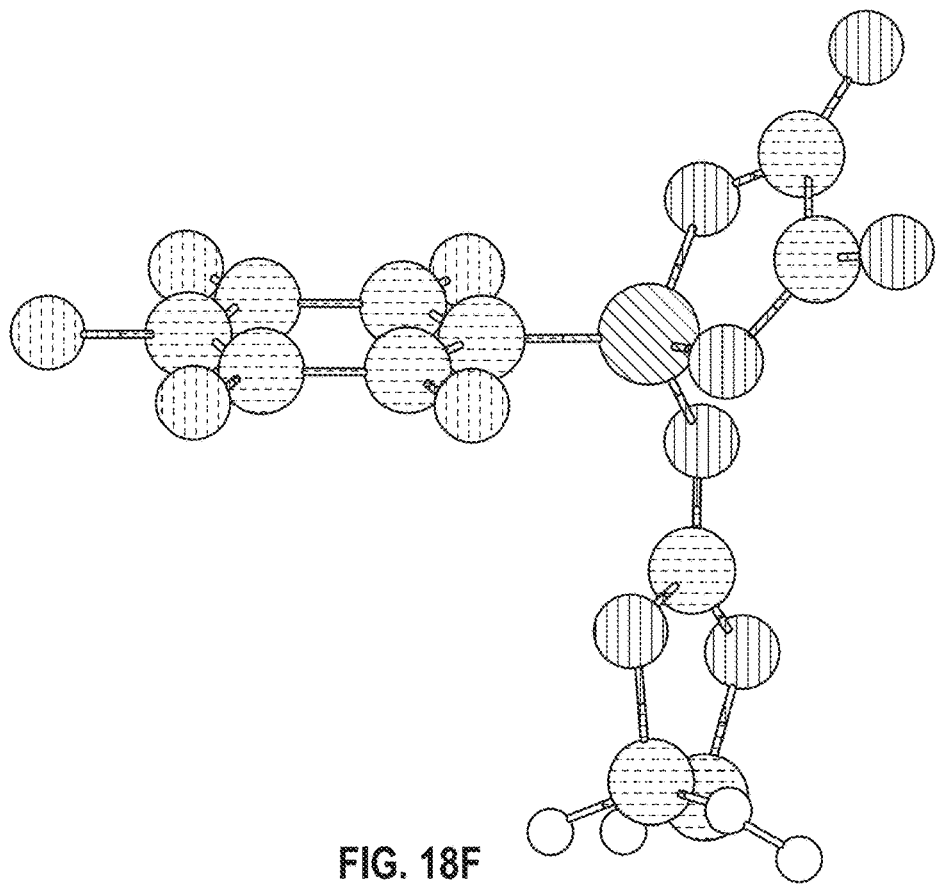
Figure 18G:
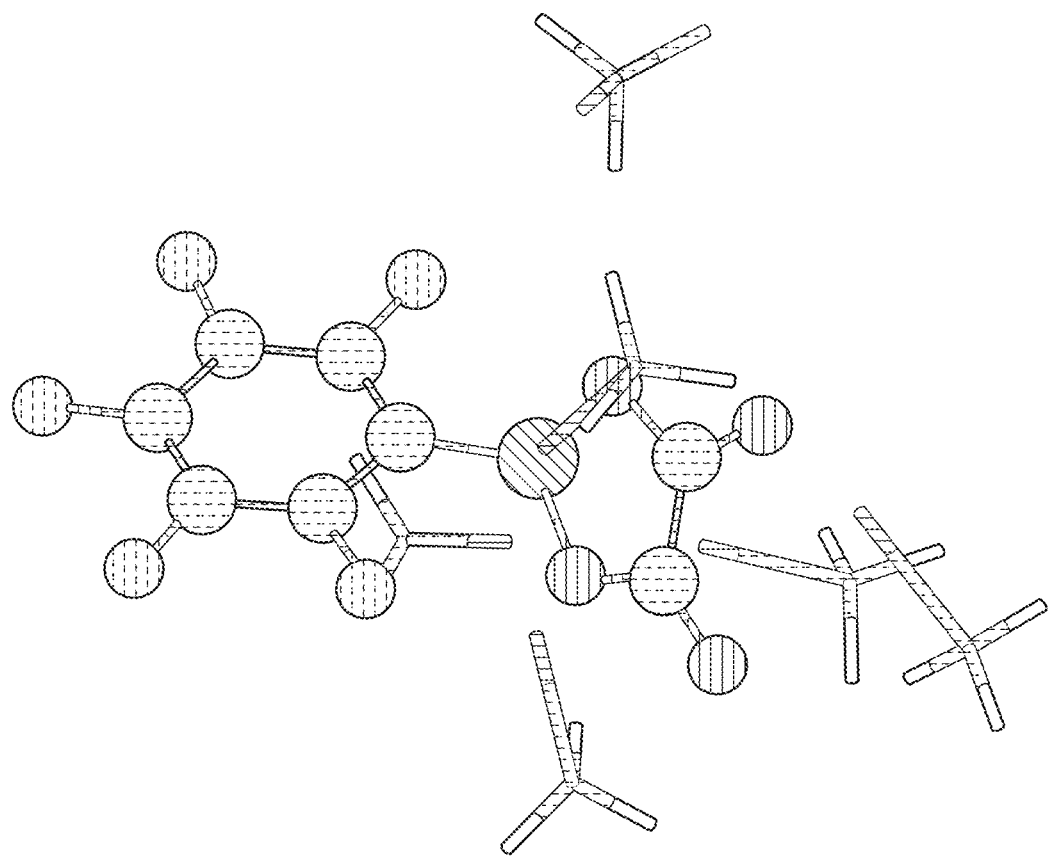
Figure 18H:
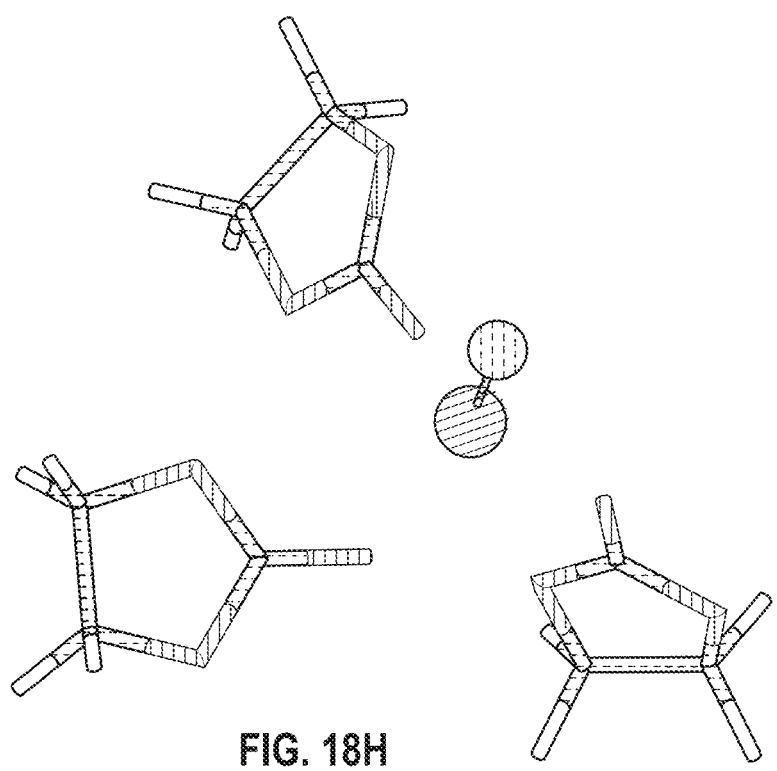
Figure 18I:
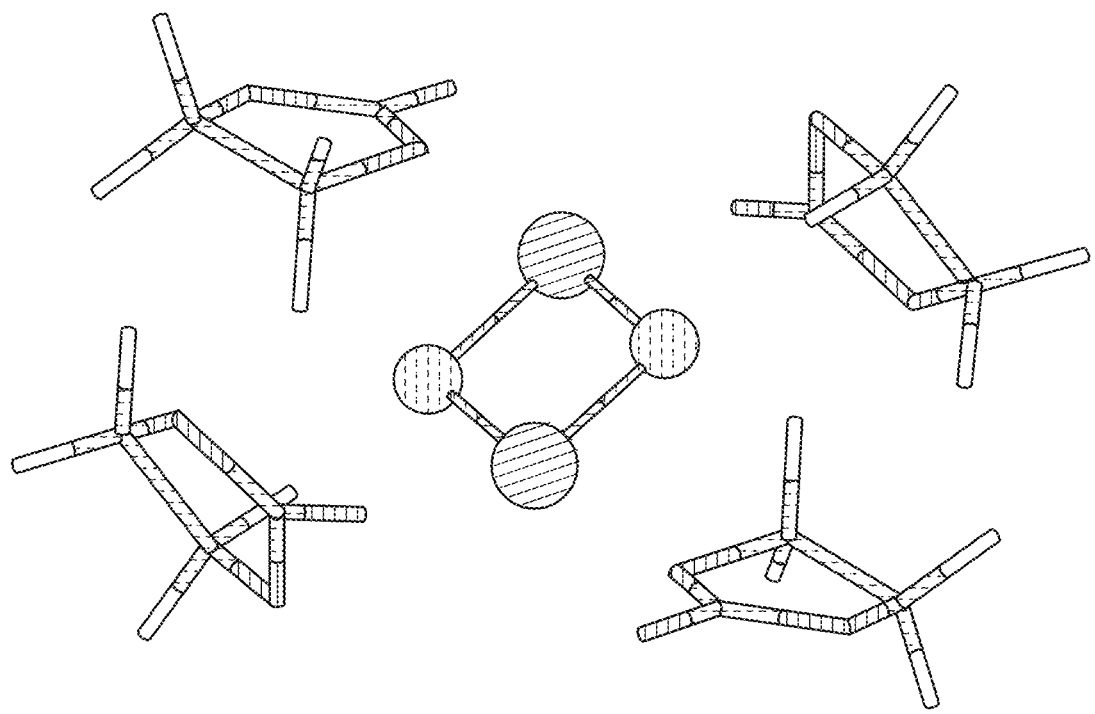

FIGS. 18A-I are schematic illustrations of structures for (A) ABAO-$CH_3CN$, (B) ABAM-$CH_3CN$, (C) ABAT-$CH_3CN$, (D) ABAO-DMC, (E) ABAO-DMSO, (F) ABAO-EC, (G) ABAO-$CH_3CN(CH_3CN)_5$, (H) LiF(EC)$_3$, and (I) Li$_2$F$_2$(EC)$_4$. FIG. 18D depicts DMC in its cis-trans conformation, which is most favorable after binding to ABAs, although unbound DMC is most stable as a cis-cis conformer.

Figure 19B:
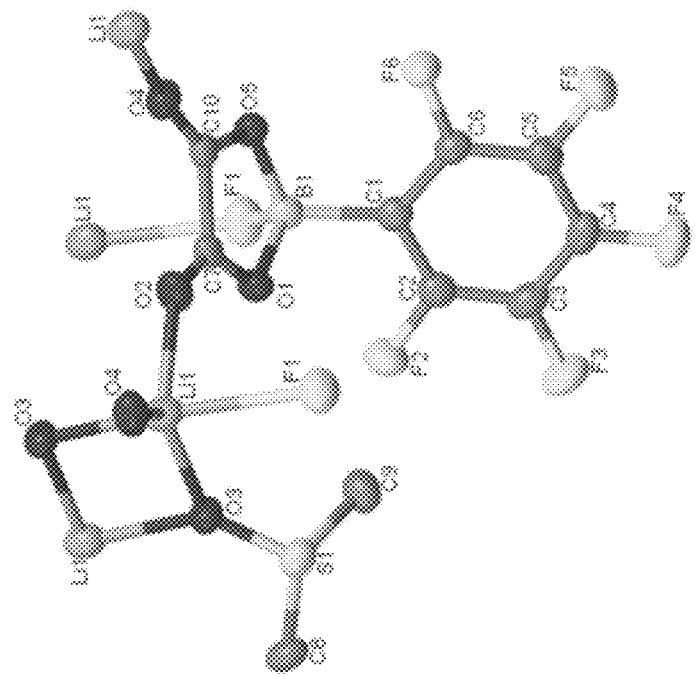
Figure 19A:
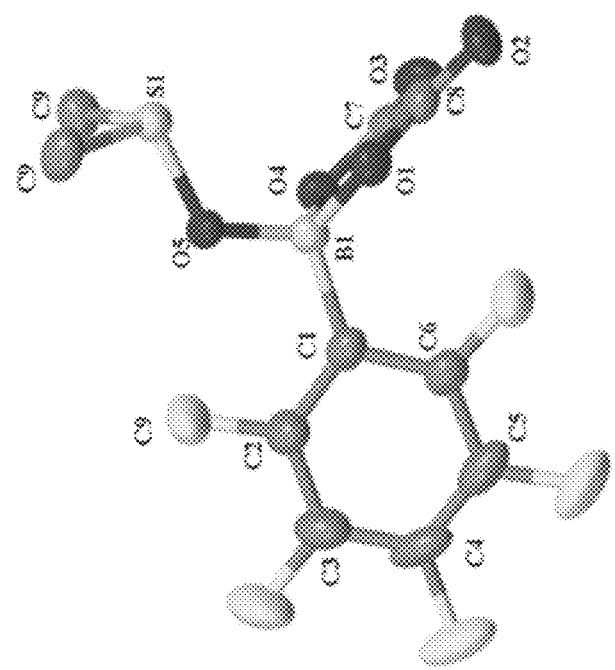

FIGS. 19A and 19B are schematic illustrations of the X-ray crystal structures of ABAO-DMSO prior to solvent exchange and ABAO-F⁻ after solvent exchange, respectively. Protons are subsumed into carbon atoms.

Figure 20:
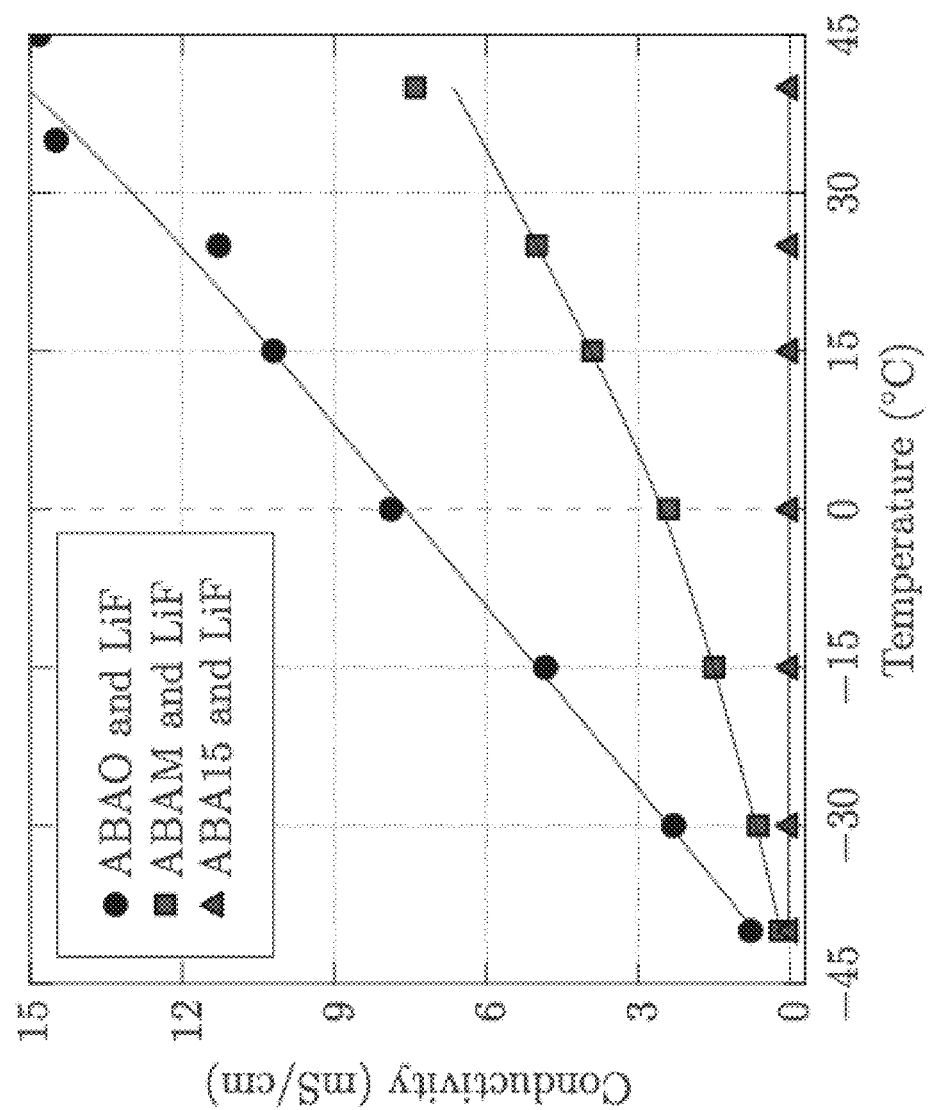

FIG. 20 is a graph of the electrolyte conductivity. Black, blue, and red represent 1.0 M ABAO, ABAM, and ABA15 added to the electrolyte (30:70 weight % EC/DMC), respectively.

DETAILED DESCRIPTION OF THE INVENTION

Organosilicon electrolytes exhibit several important properties for use in lithium cells, including high conductivity/low viscosity and thermal/electrochemical stability. According to the present invention, systematic manipulation of the siloxane backbone geometry and repeat unit length as well as the appended ethylene oxide moieties enables fine-tuning of the thermal and electrochemical properties of the electrolyte. These manipulations also allow for incorporation of innovative functionalities, such as anion binding agents (ABAs), which can dramatically change the electrochemical properties of the electrolyte and bind the fluoride anion (a byproduct of discharge) leaving lithium ions available for incorporation into the electrolyte.

Current state-of-the-art efforts to develop organosilicon electrolytes for lithium-ion applications have demonstrated many positive characteristics, such as being nonvolatile, nonflammable, oxidatively resistant, and nontoxic. See N. A. A. Rossi and R. West, *Polym. Int.* 58, 267 (2009). These properties may be finely tailored through control of geometry (comb, double-comb, cyclic, network, or linear structure), through variation in chain lengths (typically 3-7 repeat units), and through careful selection of appended ABAs. The flexible siloxane backbone facilitates low energy bond rotations that impart wide temperature stability and low viscosity allowing for wide temperature range operation while their conjugated polyethylene oxide (PEO) units solvate lithium cations via complexation with oxygen. These materials have been demonstrated to have conductivities up to ~10⁻³ S cm⁻¹ when doped with a lithium salt. See L. Zhang et al., *J. Mater. Chem.* 18, 3713 (2008). Although these compounds display excellent lithium solvation, they have poor lithium mobility due to strong ion pairing with its conjugate anion. Attempts to alleviate this problem with the introduction of polar carbonate groups have been met with limited success because the increased dielectric constant is offset by higher viscosity. See Z. Zhang et al., *Silicon Chem.* 3, 259 (2005). ABA molecules dissociate LiF by binding the fluoride ion, allowing for use of the stable LiF salt in lithium batteries. See H. S. Lee et al., *J. Power Sources* 97-8, 566 (2001); and X. Sun et al., *J. Electrochem. Soc.* 149, A355 (2002).

Figure 1:
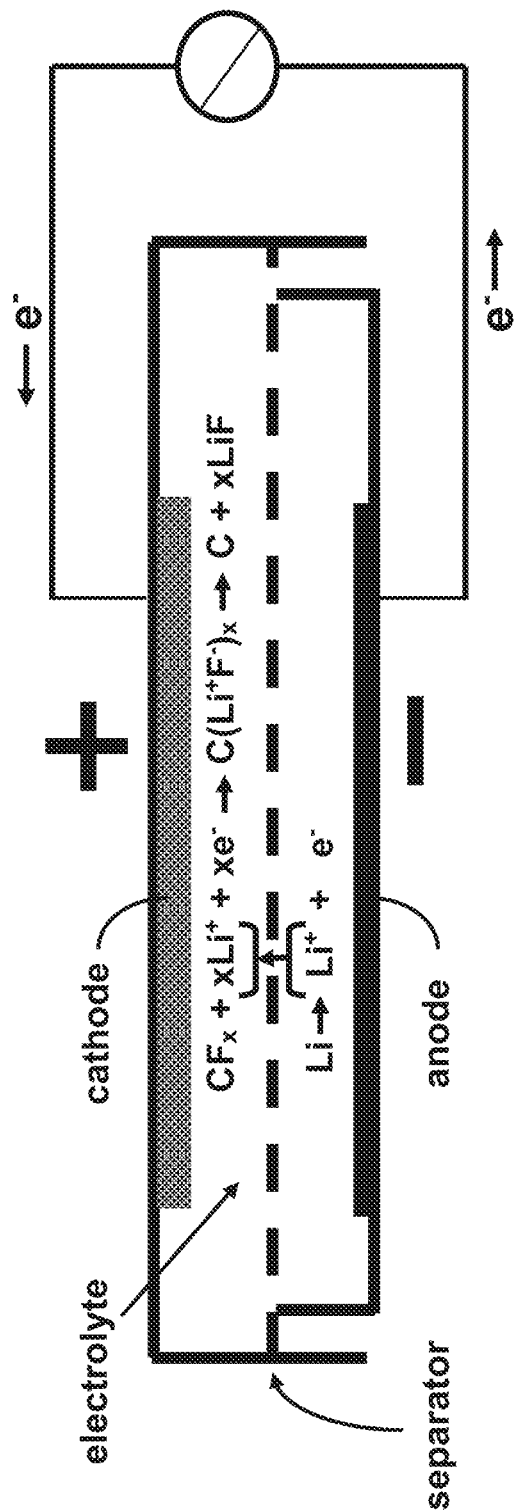
FIG. 1 is a schematic illustration of a lithium carbon monofluoride battery.
Figure 2:
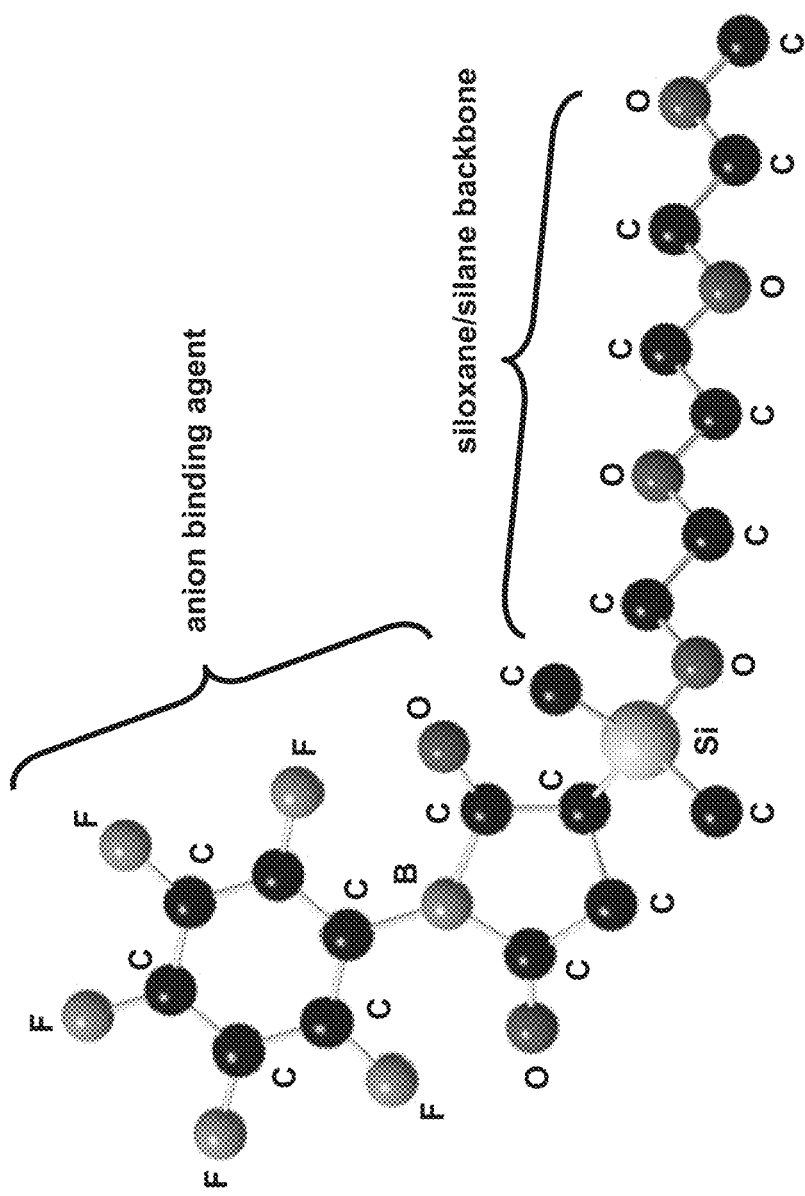
FIG. 2 is a schematic illustration of an exemplary linear bifunctional electrolyte for simultaneous control of electrode and electrolyte conductivity in a lithium primary cell.

According to the present invention, conjugation of the ABA to the siloxane backbone creates a bi-functional electrolyte. FIG. 2 illustrates an exemplary linear version of the electrolyte, comprising a siloxane/silane backbone grafted to a PEO side chain and an ABA ligand bonded to the silicon atom of the silane backbone. The bi-functionality of the electrolyte is due to the ability of the PEO moieties of the siloxane backbone to solvate lithium (control of ionic conductivity within the electrolyte) and ABA groups to bind the fluoride anion and thus facilitate lithium fluoride dissolution (effectively preserving the porous structure of the cathode). This unique ability to control both the electrolyte conductivity (by control of the siloxane geometry and repeat chain length) and the electrode morphology/properties simultaneously can improve lithium electrolyte operation.

Development of a multifunctional electrolyte system that is capable of both supporting battery discharge and dissolution of lithium fluoride will aid in the performance in the CF$_x$ lithium primary battery system. Lithium carbon monofluoride battery discharge products are LiF and C. The carbon product gives rise to increased electrical conductivity of the cathode due to the increased carbon loading. However, the LiF salt causes dramatic changes to the transport properties within the cell due to pore clogging and electrode fouling. Inclusion of an ABA ligand in the organosilicon electrolyte according to the present invention enables dissolution of the LiF salt directly, which not only increases the lithium ion concentration in the electrolyte (increased ionic conductivity) but also prevents the fouling of the cathode and effectively increases the carbon loading in the electrode (thereby increasing electronic conductivity). An electrolyte capable of both supporting conductivity and transport while simultaneously clearing the pores of discharge products can increase the total system utilization of the carbon monofluoride battery. This also enables the manufacture of batteries having low salt loading (therefore, higher stability and longer shelf life) for the initial battery start up whilst effectively scavenging highly stable lithium fluoride salt during discharge, yielding high performing and safer cells. Inclusion of other agents for specific purposes further enables development of multifunctional electrolytes.

Lithium carbon monofluoride chemistry is complicated by solvent flammability problems and low temperature performance problems due to the fouling of the cathode pores by the discharge product. To overcome these two problems, a nonflammable solvent can be used in conjunction with a thermally stable salt. By adding neutral anion binding agents (ABAs) capable of dissolving the discharge product, which in this case is lithium fluoride, to this safe electrolyte, cathode fouling during discharge can be mitigated. Addition of sub-stoichiometric amounts of LiF to the electrolyte containing an excess amount of dissolved ABA allows the solution to contain a free Li⁺ABAF⁻ salt complex and sufficient free non-complexed ABA for dissolving the discharge product. Accordingly, cell performance can be enhanced by dissolving the discharge product in real time.

Synthesis of Siloxane-Glycol Electrolyte Solvent

Figure 3:
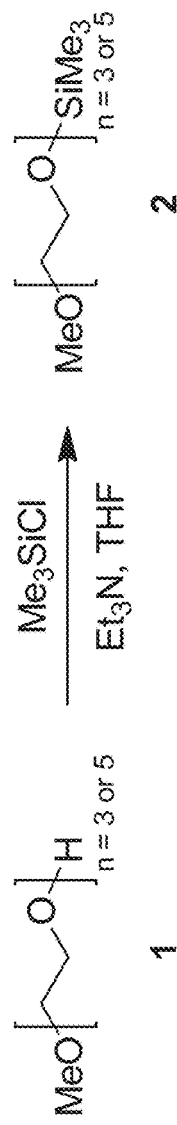
FIG. 3 is a schematic illustration of the synthesis of glycol-monosilane electrolyte solvents.

A series of siloxane-glycol electrolyte solvents were prepared to assess the impact of the siloxane and ethylene glycol repeat units on battery performance. The synthesis of a monosilane with varied ethylene glycol repeat units is shown in FIG. 3. See L. Zhang et al., *J. Mater. Chem.* 18, 3713 (2008). Commercially available ethylene glycol monomethyl ethers 1 (n=3 or 5) were deprotonated with triethylamine in tetrahydrofuran and subsequently reacted with chlorotrimethylsilane to give silyated glycol ether 2 in high yield. The silylated glycol ether 2 was further purified by fractional distillation.

Figure 4:
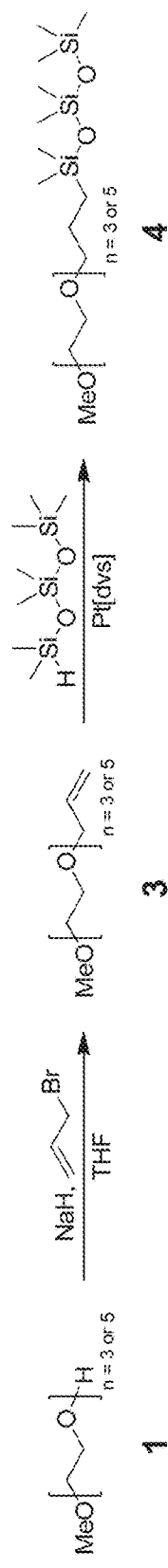
FIG. 4 is a schematic illustration of the synthesis of glycol-trisiloxane electrolytes.

To increase the number of repeat units in the siloxane from one to three, a two-step procedure was utilized, as shown in FIG. 4. See Z. Zhang et al., *J. Power Sources* 195, 6062 (2010). The commercially available ethylene glycol monomethyl ethers 1 (n=3 or 5) were initially deprotonated with sodium hydride in tetrahydrofuran and subsequently reacted with allyl bromide to yield allylated ether 3. The allylated ether 3 was then hydrosilylated with 1,1,1,3,3,5,5-heptamethyltrisiloxane using Karstedt's catalyst to yield glycol-trisiloxane 4. Glycol-trisiloxane 4 was further purified by fractional distillation.

Figure 5:
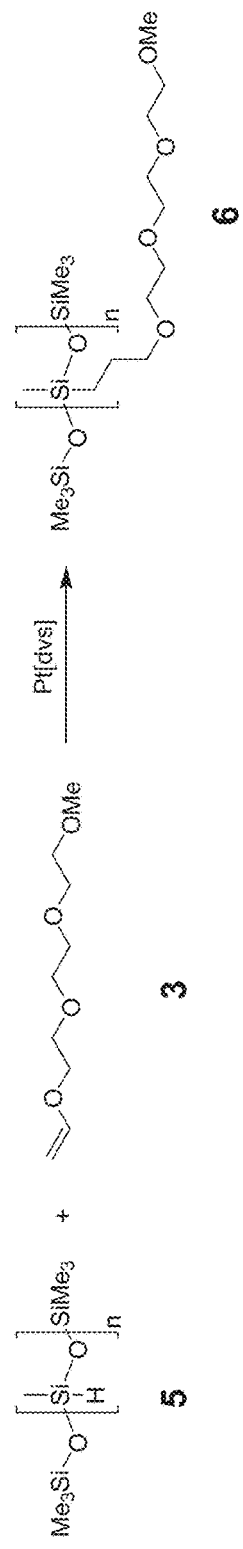
FIG. 5 is a schematic illustration of the synthesis of a siloxane-glycol comb polymer.

With the preparation of small molecule siloxane-ethylene glycol electrolyte solvents, a polymeric comb structure was also prepared. The synthesis of this material is similar to the preparation of trisiloxane compounds 4 shown in FIG. 4. Briefly, polymethylhydrosiloxane 5 ($M_n$=1700 to 3200) was reacted with allylated ether 3 (n=3) in the presence of Karstedt's catalyst to yield comb polymer 6, as shown in FIG. 5. A number of different purification strategies including activated charcoal, $SiO_2$ chromatography and distillation, were performed on polymer 6, but the color post-purification was slightly yellow, suggesting Pt removal was incomplete. Ultimately the high viscosity of this polymer may limit its utility in a battery.

Figure 6:
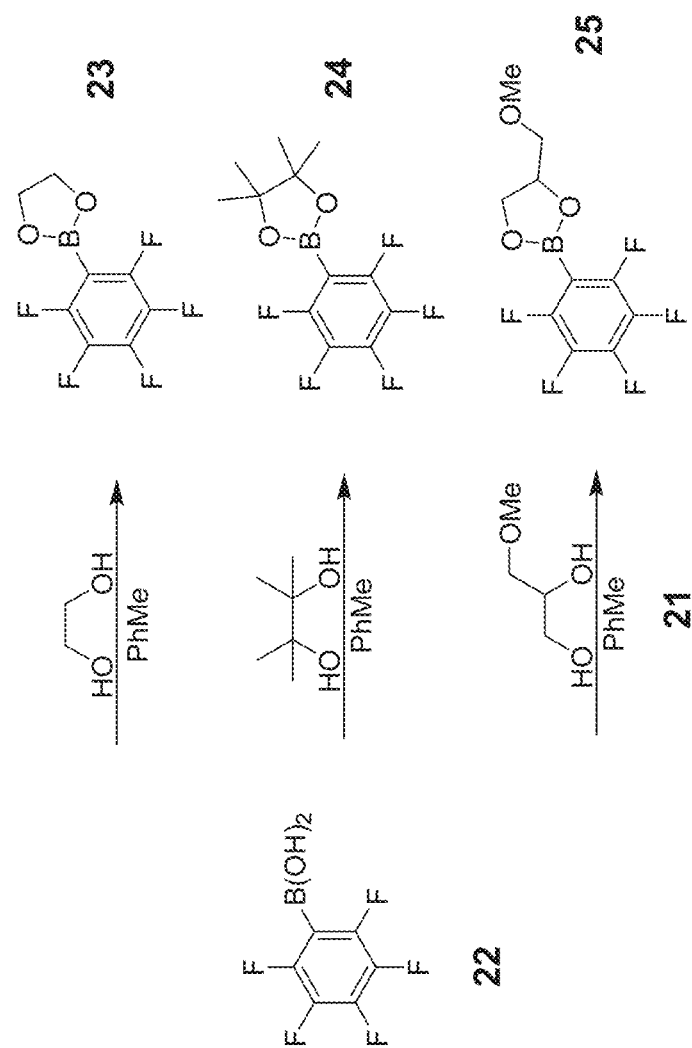
FIG. 6 is a schematic illustration of the synthesis of a diol ABAs.

Synthesis of Boron Based Anion Binding Agents (ABAs): Attachment of Electrolyte Solvent Through Dioxo-Functionality As an example of the invention, a number of small molecules were prepared to incorporate the siloxane-glycol functionality through the boronic ester. Each diol 21 shown in FIG. 6 was separately reacted with pentafluorophenylboronic acid 22 in refluxing toluene. See A. Adamczyk-Wozniak et al., *J. Phys. Org. Chem.* 26, 415 (2013). A Dean-Stark apparatus was used to continuously remove water from the reaction flask. All dioxaborolanes 23, 24, and 25 were prepared in high yield and purity. Each compound could be further purified using sublimation (dioxaborolanes 23 and 24) or vacuum distillation (dioxaborolane 25).

Figure 7:
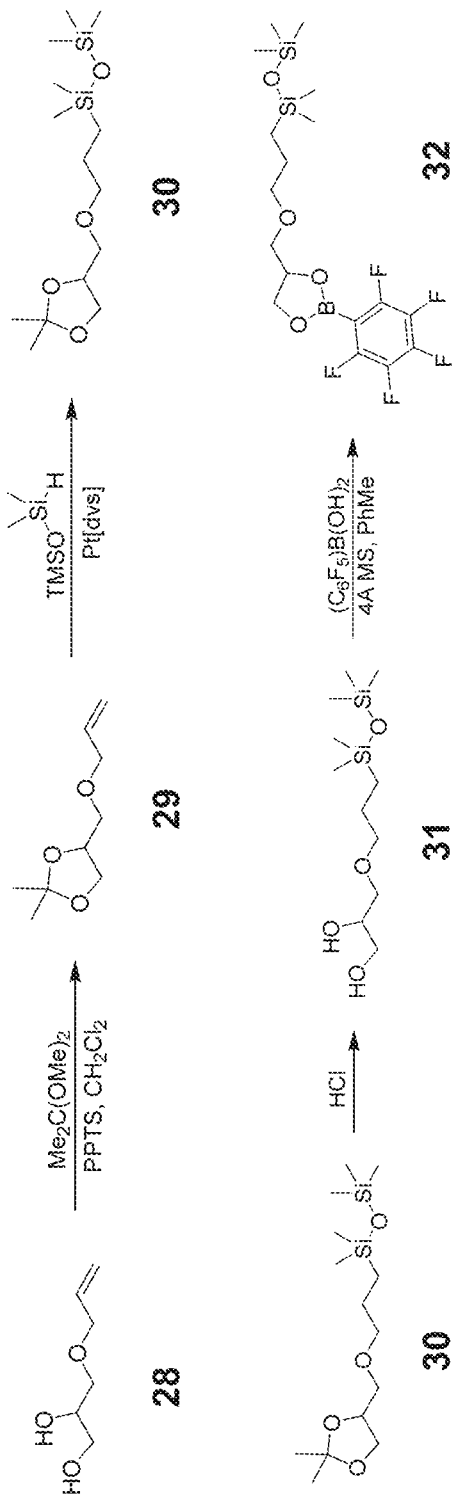
FIG. 7 is a schematic illustration of the synthesis of a siloxane-linked ABA.

Based on the small molecule syntheses with the diols and acids, a diol with glycol and siloxane functionality was prepared for reaction with pentafluorophenylboronic acid, as shown in FIG. 7. The diol of allylated glycerol 28 was protected as the acetonide by reaction of 2,2-dimethoxypropane and pyridinium p-toluenesulfonate (PPTS) in $CH_2Cl_2$. Hydrosilyation of acetonide 29 with pentamethyldisiloxane and Karstedt's catalyst yielded disiloxane 30. The acetonide in disiloxane 30 was removed using aqueous HCl in THF to give diol 31. The yield of the deprotection was quite low (~20 to 30%) relative to the two previous steps and required $SiO_2$ chromatography prior to the boronation step. NMR suggested the siloxane was partially decomposing during the deprotection. Refluxing diol 31 in toluene with pentafluorophenylboronic acid lead to a mixture of products that were difficult to purify. Alternatively, diol 31 was reacted with the pentafluorophenylboronic acid at room temperature in the presence of activated 4 Å molecular sieves. The milder reaction conditions yielded boronic ester 32 as a viscous oil.

Figure 8:
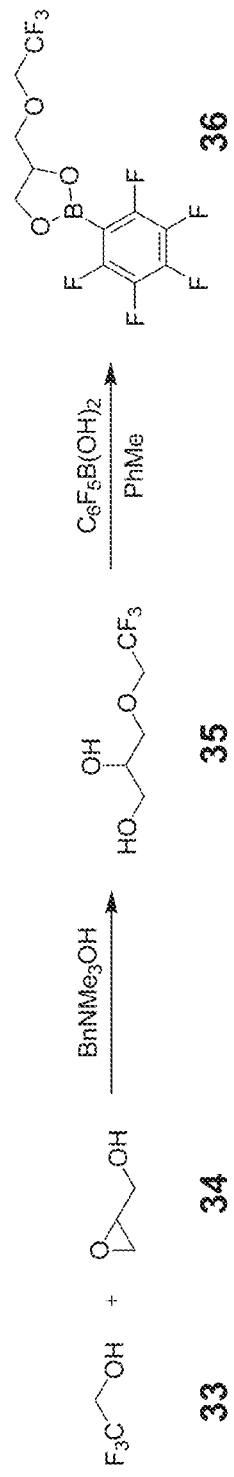
FIG. 8 is a schematic illustration of the synthesis of a liquid-phase fluorous ABA.

With the success of the boronic ester 32 synthesis an analog was also prepared whereby the siloxane functionality was replaced with a fluorous group, as shown in FIG. 8. To prepare boronate ester 36, trifluoroethanol 33 was reacted with (±)-glycidol 34 in the presence of benzyltrimethylammonium hydroxide catalyst to give fluorous diol 35. Using a Dean-Stark apparatus fluorous diol 35 was refluxed with pentafluorophenylboronic acid in toluene. After concentrating the solution, fluorous boronic ester 36 was purified by vacuum distillation to give a viscous oil.

Testing of Siloxane-Linked ABA and Liquid-Phase ABA Based Systems

The siloxane-linked boronic ester 32 and the liquid-phase fluorous boronic ester 36 do appear to have difficulty with the purification steps at the end of their synthesis (e.g., synthetic transitions from compound 30 through 32 in FIG. 7). Because of the low yield during these steps, the disiloxane 30 preceding the ABA linkage was also investigated as a stand-alone electrolyte for lithium-based battery systems, as further described below in the section titled acetonide-siloxane based systems.

Figure 9:
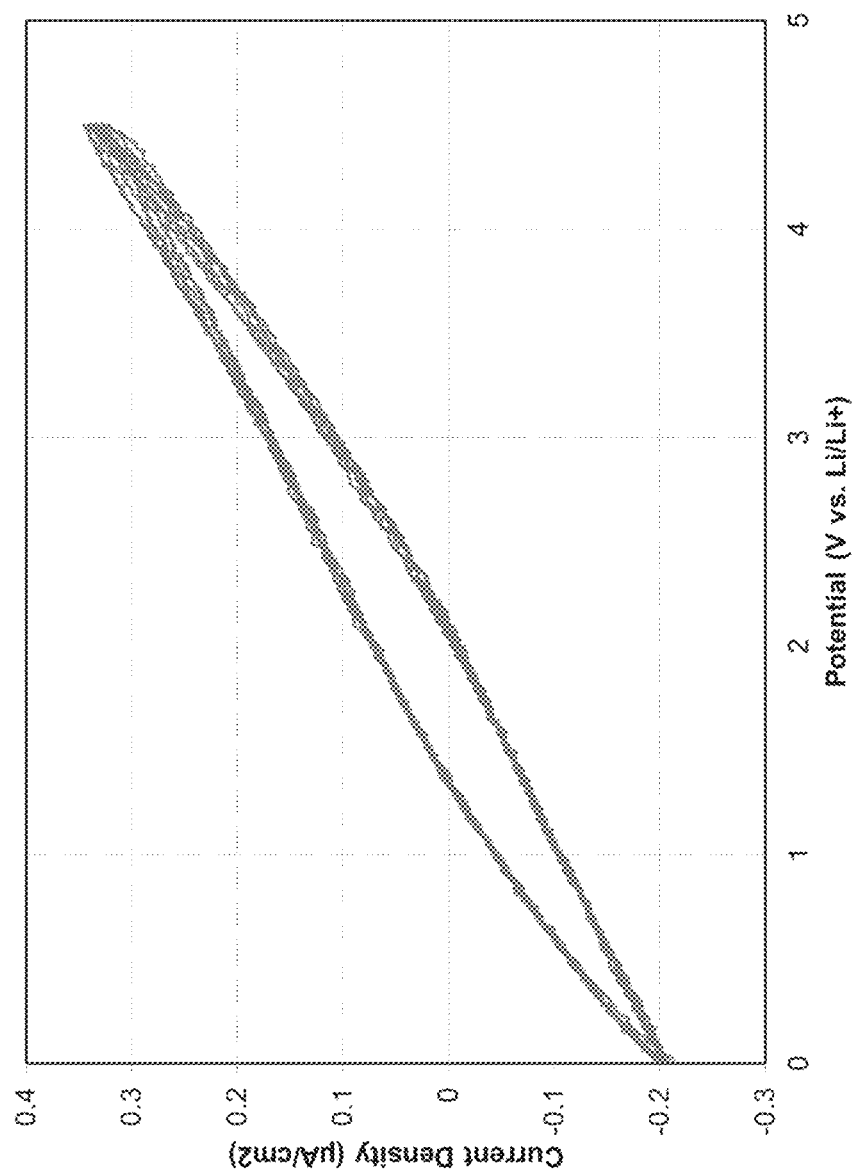
FIG. 9 is a cyclic voltammogram of the siloxane-linked ABA material.

Electrochemical stability was evaluated for the siloxane-linked ABA material. A representative cyclic voltammogram for this material is shown in FIG. 9. This voltammogram shows the electrochemical stability of the siloxane-linked ABA materials in the absence of lithium-based salts. As expected, the response for these materials is mostly resistive with a small capacitive contribution from the double layers present in the measurement. The electrochemical stability window for these materials also extends up to at least 4.5V, which is much larger than the range needed for the $CF_x$ lithium primary battery system. This indicates that this electrolyte may be suitable for not only current lithium ion systems (those with an approximate 4.2V working window) but also future high voltage systems, like the spinel systems, with working voltages up near 4.6 V.

Differential scanning calorimetry (DSC) was performed to evaluate the thermal stability of the synthesized materials. DSC traces for both the siloxane-linked ABA and the liquid-phase ABA are shown in FIGS. 10A and 10B, respectively. Both the siloxane-linked ABA and the liquid-phase ABA materials are very thermally stable. Both exhibit exotherms at temperatures above 350° C. The materials exhibit very small exotherm peaks at ~175° C. and ~240° C., respectively, but complete breakdown of the material does not happen until elevated temperature as compared to currently used electrolytes.

Figure 11B:
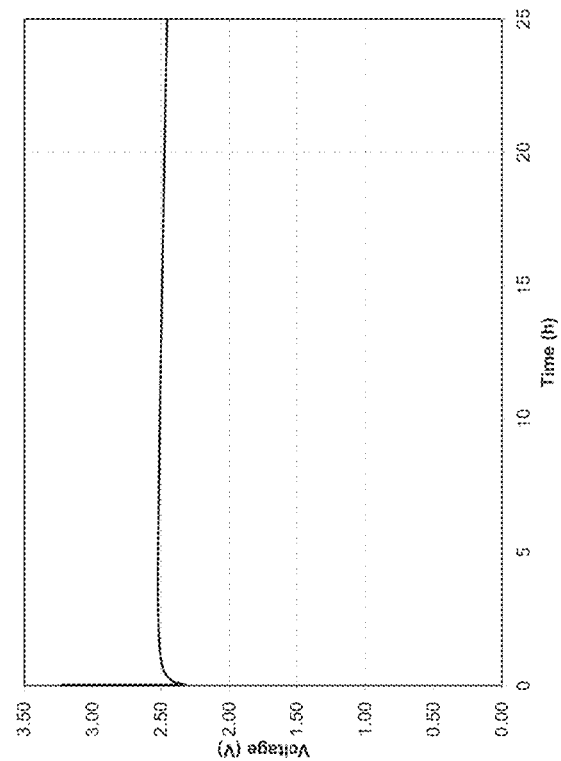
FIGS. 11A and 11B show discharge comparisons for $CF_x$ 2032 coin cells using standard 3:7 (w %) EC:EMC based electrolyte with 1.2M $LiPF_6$ (FIG. 11A) versus synthesized siloxane-linked ABA materials using 1.2M $LiPF_6$ (FIG. 11B).
Figure 11A:
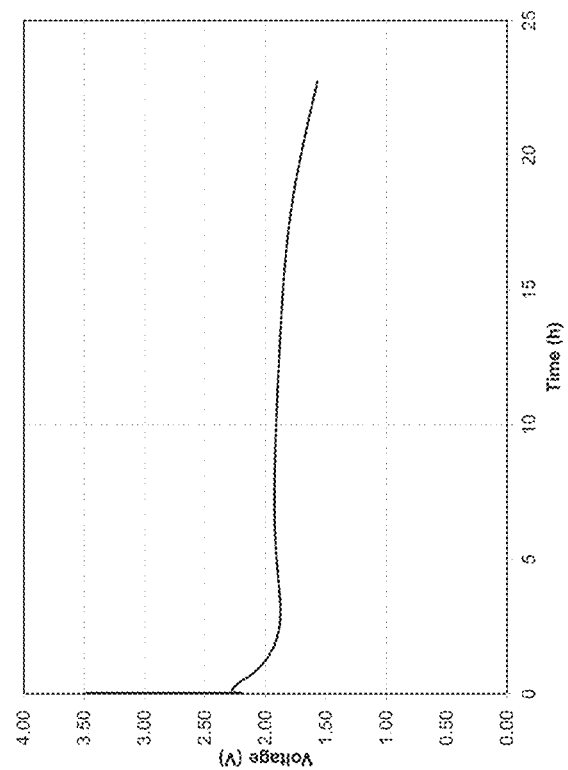

Electrochemical cells were fabricated using these materials to evaluate their ability to support discharge current in full cells containing carbon monofluoride cathodes and lithium anodes. Electrodes were coated with a ratio of 94:3:3 $CF_x$ active material:Kureha PVDF:Denka conductive carbon on a reel-to reel-reverse comma coater. Electrodes were punched using a 0.625" Di-acro punch and assembled into 2032 coin cells versus ~8 mil lithium anodes. Cells were discharged at approximately C/50 discharge rates to evaluate the difference in polarization of current state of the art electrolytes versus the synthesized siloxane-linked ABA material, as shown in FIGS. 11A and 11B. While the discharge using the siloxane-linked ABA material shows a high polarization upon application of discharge current, there has been no previous demonstration of electrolyte that is also capable of lithium fluoride dissolution in solution. The capacity of this material was evaluated to be on the order of tens of millimolar in solution with the solvent alone. This capacity demonstrates an active electrolyte that can support both discharge transport rates and increased battery longevity and electrolyte conductivity.

The primary voltage loss seen in FIG. 11B is attributed to the limited dielectric strength of the electrolyte material. The dielectric constant for this material was measured to be 3.01, which is sufficiently low to inhibit complete dissolution. Not only does this lead to decreased LiF dissolution initially, but also contributes to an overall increased battery resistance as compared to the carbonate-based systems. As shown later in FIG. 13, this effect is not directly a result of lower conductivity but also has contributions due to dielectric constant. Additionally, the electrolytes used that utilize larger siloxane-based materials tend to exhibit higher viscosities, which also contribute to higher cell polarizations. In order to combat these difficulties, electrolyte blends can be used to optimize cell performance (as is the common solution for battery electrolytes).

Acetonide-Siloxane Based Systems

The acetonide-siloxane solvent 30 is a clear liquid at room temperature with low viscosity. This solvent exhibits low solubility for Li-salts such as $LiPF_6$ and ABA-LiF. This is primarily due to low dielectric constant. This is consistent with many battery solvents, which is why the typical battery electrolyte contains several solvent species. Each of these solvents is typically responsible for increasing certain performance metrics for the electrolyte. Therefore, other aprotic solvents, including DMMP, F-EC, EMC, DEC, were mixed with the acetonide-siloxane solvent to improve performance of the electrolyte. These solvent blends dissolved $LiPF_6$ and the ABA-LiF salts but, unfortunately, these mixtures did not only phase separate but also began to discolor with time. The formulations tested can be seen in Table 1.

TABLE 1

Electrolytes Formulations Based on Acetonide-Siloxane Solvent.

| Solvent(s) | Salt | Composition | Comment |
| --- | --- | --- | --- |
| EC:EMC | $LiPF_6$ | (3:7)w % - 1.2M | No discoloration and phase separation |
| EMC:acetonide-siloxane | $LiPF_6$ | (1:2)v % - 1.2M | Discoloration/phase separation |
| DEC:acetonide-siloxane | $LiPF_6$ | (1:2)v % - 1.2M | Discoloration/phase separation |
| DMMP:acetonide-siloxane | $LiPF_6$ | (1:2)v % - 1.2M | No discoloration/phase separation/gelling out |
| DMMP:acetonide-siloxane | Ox-ABA-LiF | (1:2)v % - 1M | Discoloration/phase separation |
| F-EC:acetonide-siloxane | Ox-ABA-LiF | (1:2)v % - 1M | Discoloration/phase separation |

Figure 12:
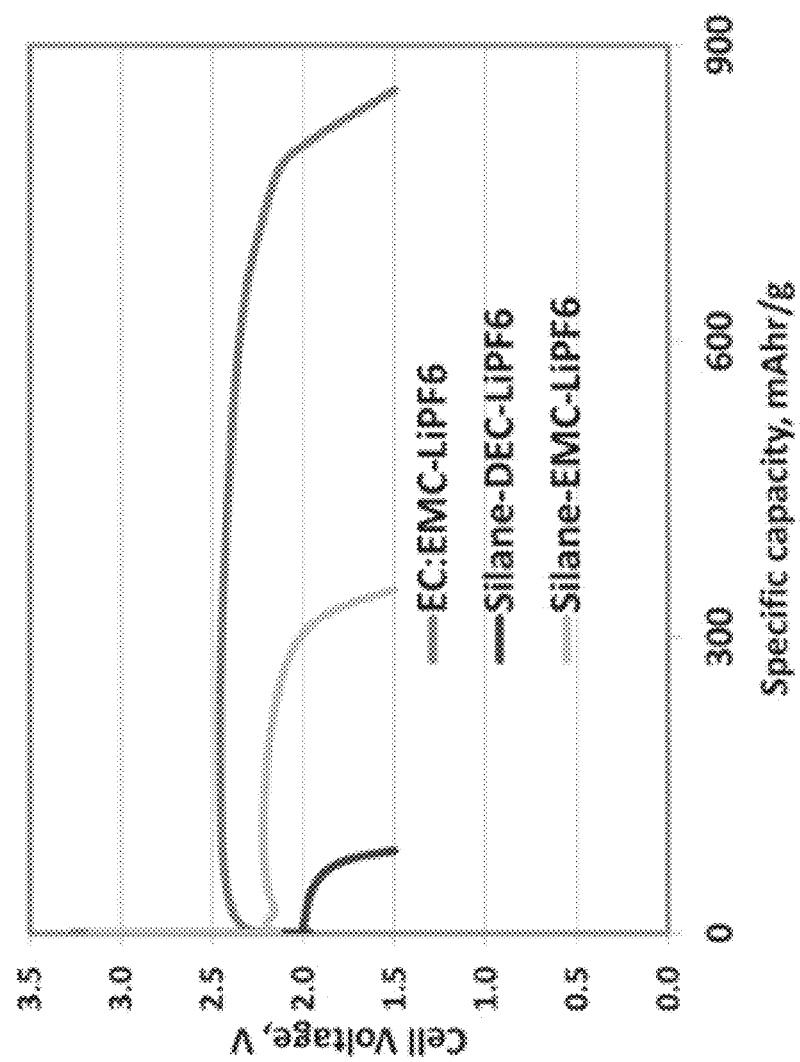
FIG. 12 is a graph showing the discharge performance for electrolytes composed of acetonide-siloxane with several other co-solvents using 1.2M $LiPF_6$. The control electrolyte (blue) is EC:EMC (3:7 wt %) with 1.2M $LiPF_6$. Discharge rates were kept at C/50 and calculated from the weight of the cathode active material.

Each of these electrolytes was assembled into 2032 coin cells using ARC $CF_x$, where x=1.0, to evaluate their ability to support discharge. Due to obvious reaction in solution, it was anticipated that these materials would be highly performing in a full cell. FIG. 12 shows discharge capacity comparison at a C/50 rate. The discharge capacity normalized per gram of active material is plotted in the x-axis. The performance of the control far exceeds that of the acetonide-siloxane containing solvent blends.

Figure 13:
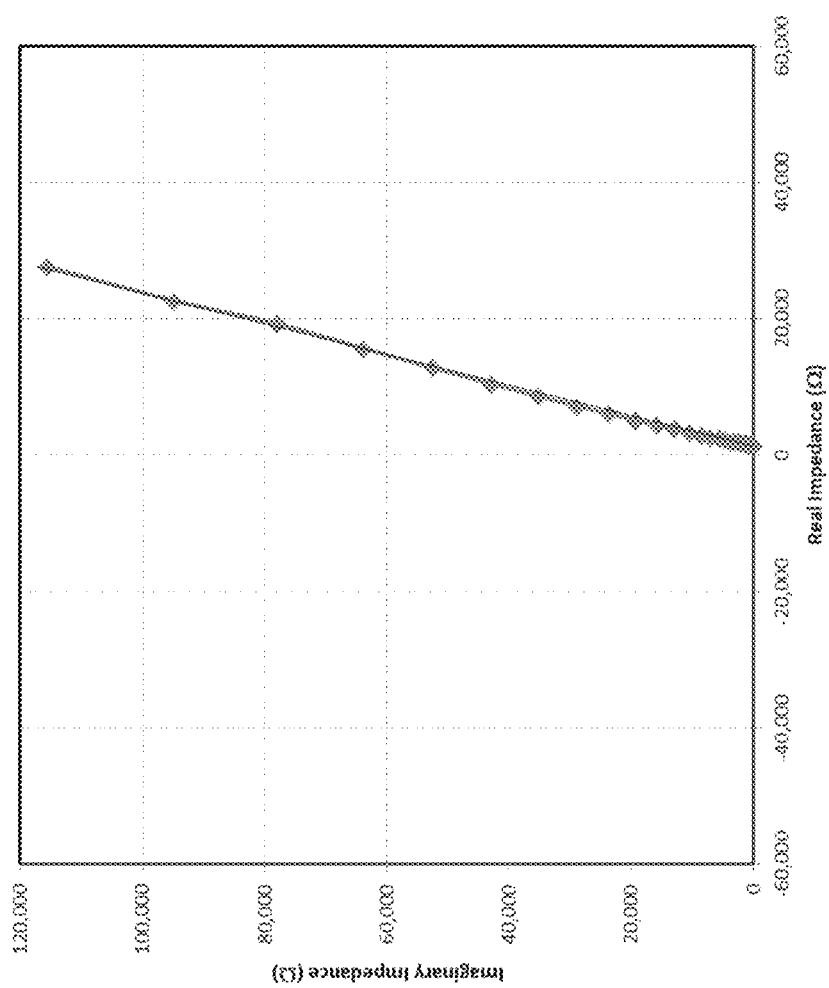
FIG. 13 shows electrochemical impedance spectroscopy data for acetonide-siloxane:DMMP (2:1 v %) with 1M oxalic ABA and 1M LiF at 25° C. The resulting electrolyte conductivity for this material is 2 mS $cm^{-1}$.
Figure 14:
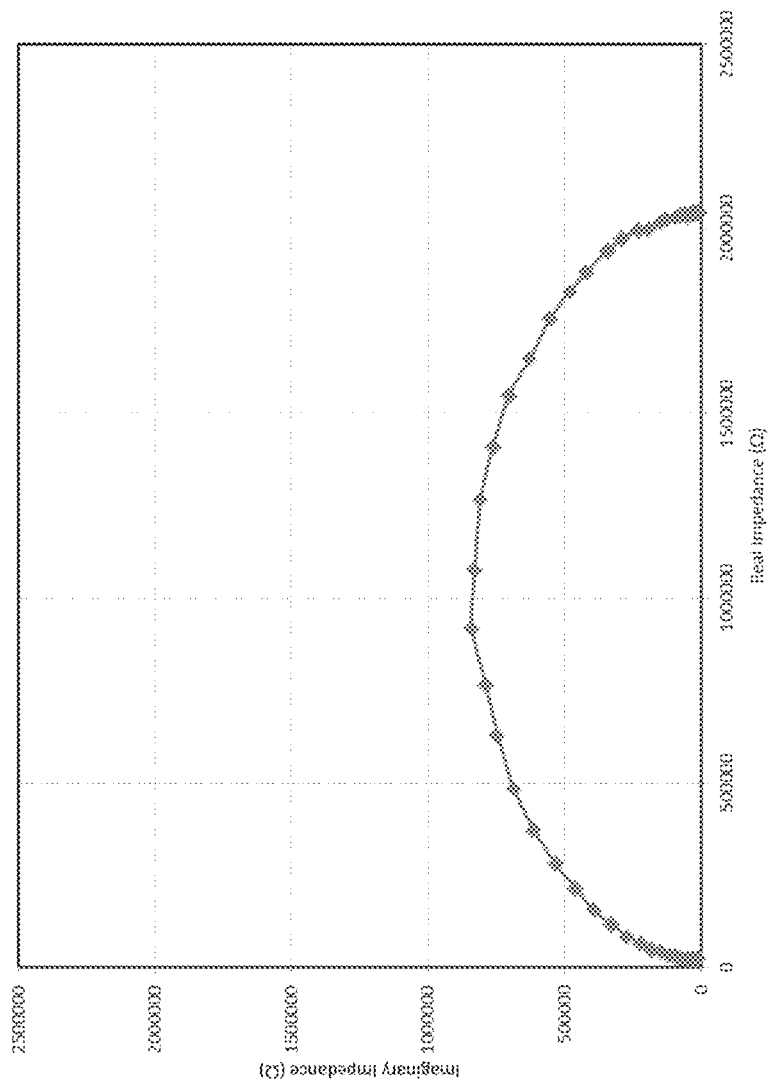
FIG. 14 shows electrochemical impedance spectroscopy of a 2032 coin cell with a $CF_x$ cathode and lithium metal anode at 3.6 V. The phase separated acetonide-siloxane with 1M oxalic ABA and 1M LiF electrolyte was used.

The primary reason for the low specific capacity can be attributed to low conductivity and dielectric constant for these materials. To demonstrate this effect, the DMMP:acetonide-siloxane-$LiPF_6$ material was used to perform electrochemical impedance spectroscopy. This was done using an electrochemical cell containing glassy carbon electrodes with a surface area of 0.07 cm² and a gap of 0.2 cm between the electrodes. The frequency was swept from 1 MHz to 1 Hz using a solartron 1287/1260 potentiostat and frequency response analyzer. The resulting impedance for the electrolyte was calculated to be 2 mS/cm at 25° C. as shown in FIG. 13. This is not as high as the control electrolytes, indicating that the lower dielectric constant for these materials also directly influences the decreased cell performance. This is also evidenced in the impedance values for the full cells that were prototyped using the same electrolyte. As shown in FIG. 14, the Nyquist plot of impedance clearly shows that the cell impedance is very high, on the order of megaohms. The high impedance is likely a direct result of the inability of the acetonide-siloxane solvent to dissolve the Li-salt, which is responsible for ionic conduction.

DFT Modeling and Conductivity Studies of Boron-Based Anion Receptors

Anion receptors that bind strongly to fluoride anions in organic solvents can help dissolve the lithium fluoride discharge products of primary carbon monofluoride ($CF_x$) batteries, thereby preventing the clogging of cathode surfaces and improving ion conductivity. The receptors are also potentially beneficial to traditional lithium and lithium air batteries. Therefore, as described below, ab initio methods based on density functional theory (DFT) were used, in conjunction with conductivity measurements, to determine the binding affinities of various anion receptors to fluoride anions. Such receptors can be used as anion binding agents in organosilicon-based electrolytes.

The application of boron-based anion receptors (denoted "ABA" herein) in lithium ion and metal-air batteries has been an area of active research. See V. P. Reddy et al, *J. Power Sources* 247, 813 (2014); X. Sun et al., *Electrochem. Solid-State Lett.* 1, 239 (1998); H. S. Lee et al., *J. Electrochem. Soc.* 145, 2813 (1998); N. G. Nair et al., *J. Phys. Chem. A* 13, 5918 (2009); D. Shanmukaraj et al., *J. Am. Chem. Soc.* 132, 3055 (2010); Y. Qin et al., *J. Phys. Chem. C* 114, 15202 (2010); Z. Chen and K. Amine, *J. Electrochem. Soc.* 156, A672 (2009); L. F. Li et al., *Electrochem. Comm.* 11, 2296 (2009); Y. Zhu et al., *J. Electrochem. Soc.* 161, A580 (2014); N. S. Choi et al., *Electrochem. Acta* 53, 6575 (2008); and E. Rangasamy et al., *J. Am. Chem. Soc.* 136, 6874 (2014). Boron-based anion receptors often contain strongly electron withdrawing pentafluorophenyl (—$C_6F_5$) groups. An often-cited example is tris(pentafluorophenyl)borane (TPFPB). See X. Sun et al., *Electrochem. Solid-State Lett.* 1, 239 (1998); and N. G. Nair et al., *J. Phys. Chem. A* 113, 5918 (2009). ABAs with multiple phenyl groups tend to be bulky molecules, and can yield viscous electrolytes that impede ionic motion. Slow ionic transport adversely impacts rate capability and other functionalities in an electrochemical storage system. As an example, an oxalate-based pentafluorophenylboron compound "ABAO" (shown in FIGS. 15A and 17A), with the boron atom bound to only one $C_6F_5$ ring in addition to two oxygen termini of an electron-withdrawing oxalic group was examined. See V. P. Reddy et al., *J. Power Sources* 247, 813 (2014); and L. F. Li et al., *Electrochem. Comm.* 11, 2296 (2009). Using electronic structure Density Functional Theory (DFT) techniques, the ABAO gas phase $F^-$ binding free energy was found to be comparable to many higher molecular weight anion receptors that have been examined with computational methods. The gas phase energetics of a subset of ABAs taken from Chen and Amine and shown in FIGS. 15 and 17, are described below. See Z. Chen and K. Amine, *J. Electrochem. Soc.* 156, A672 (2009).

DFT methods were used to examine how different ABA's and solvent molecules (S) affect the LiF dissolution free energy ($\Delta G_{diss}$), according to:

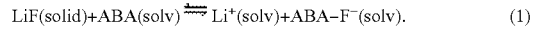

$$\text{LiF(solid)} + \text{ABA(solv)} \rightleftharpoons \text{Li}^+(\text{solv}) + \text{ABA-F}^-(\text{solv}). \quad (1)$$

Figure 16:
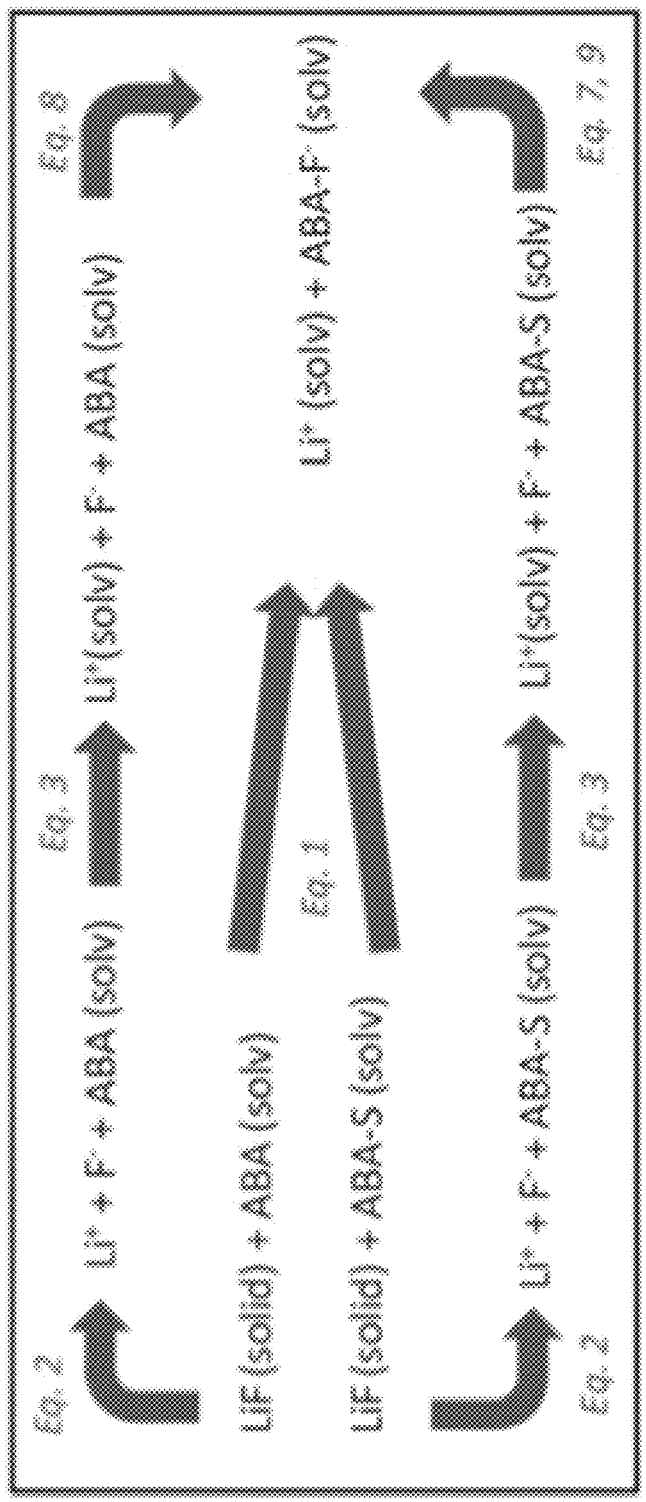
FIG. 16 is a schematic illustration of the thermodynamic cycle. The lower and upper halves pertain to ABA anion receptors that bind or do not bind covalently to a solvent molecule ("S"), respectively. Brackets indicate the phase (solid or solvated); their absence denotes gas phase. Relevant equations in each step are labeled.
Figure 17A:
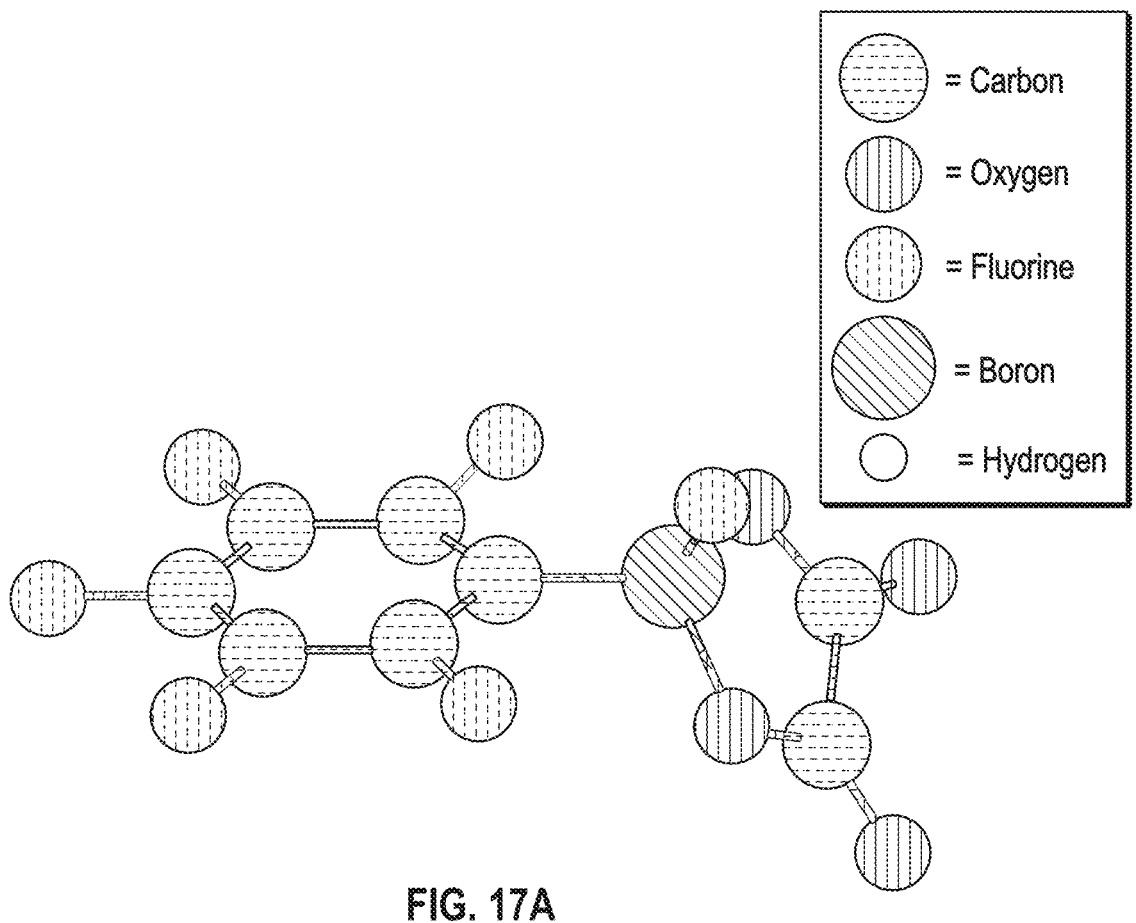
FIGS. 17A-F are schematic illustration of structures for (A) ABAO, (B) ABAM, (C) ABAE, (D) ABA12, (E)
Figure 17B:
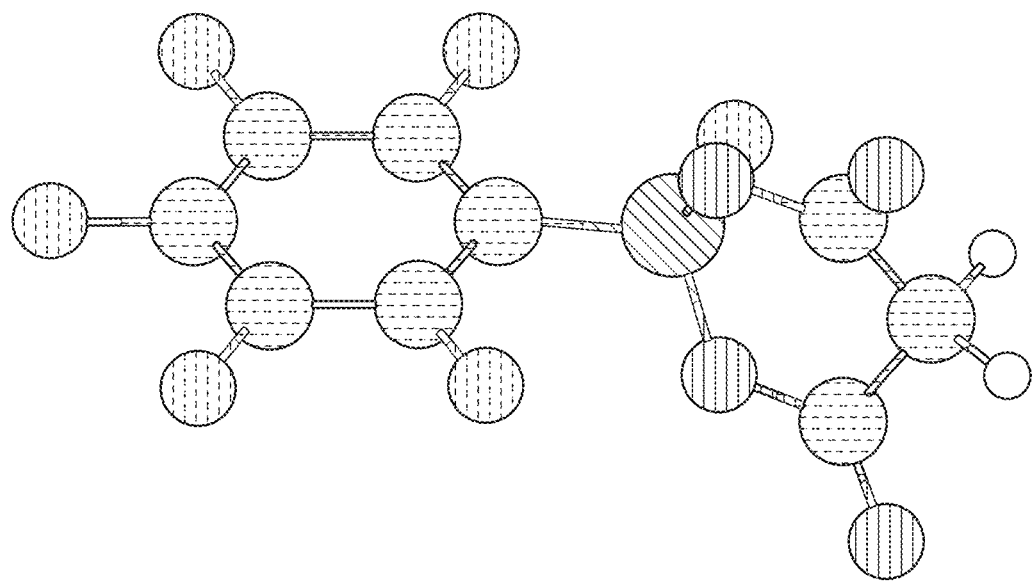
Figure 17C:
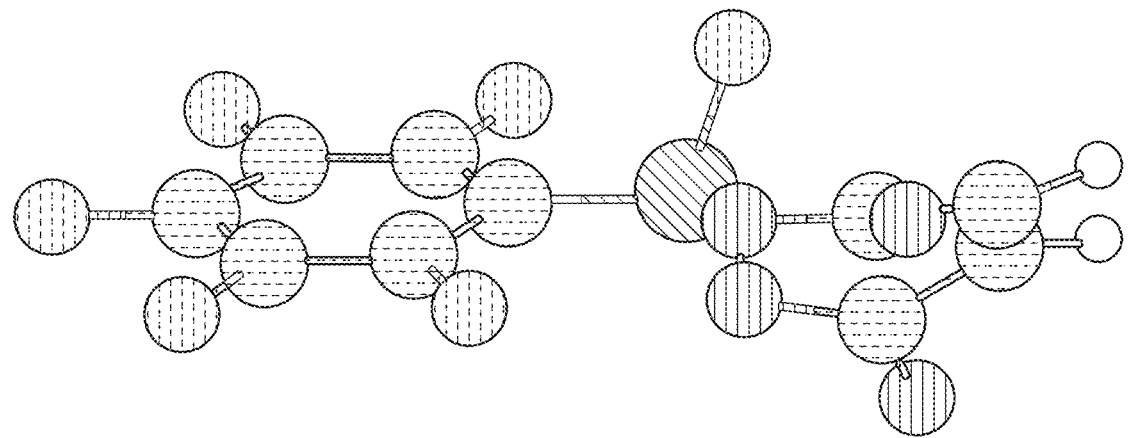
Figure 17D:
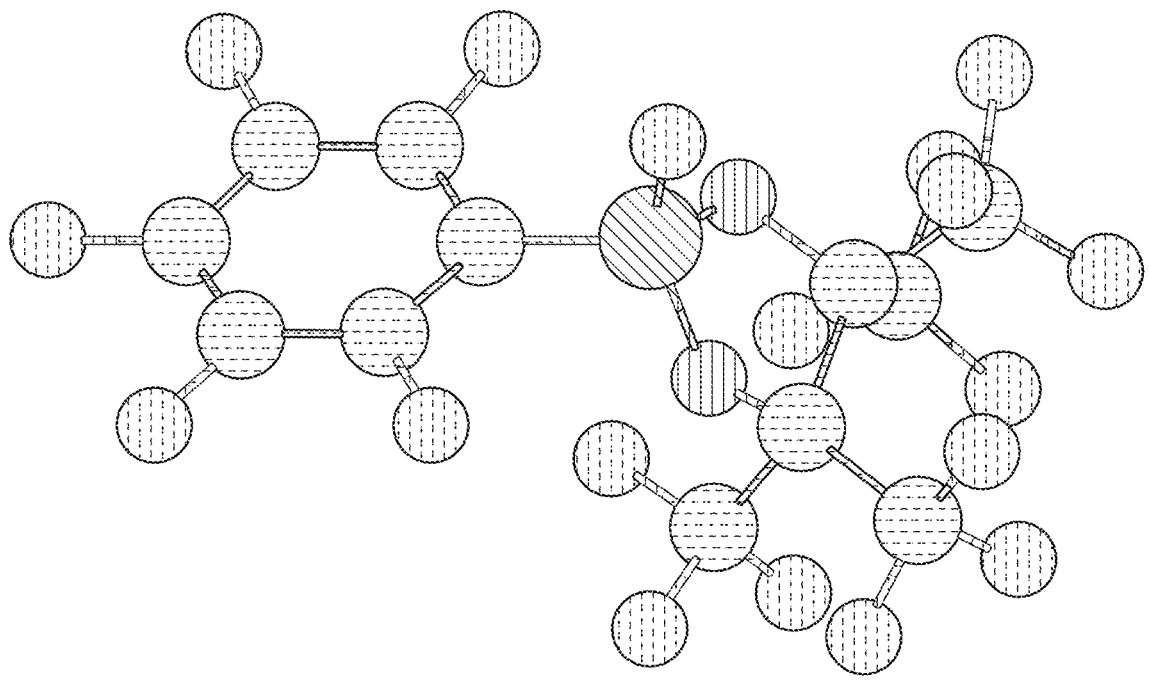
Figure 17E:
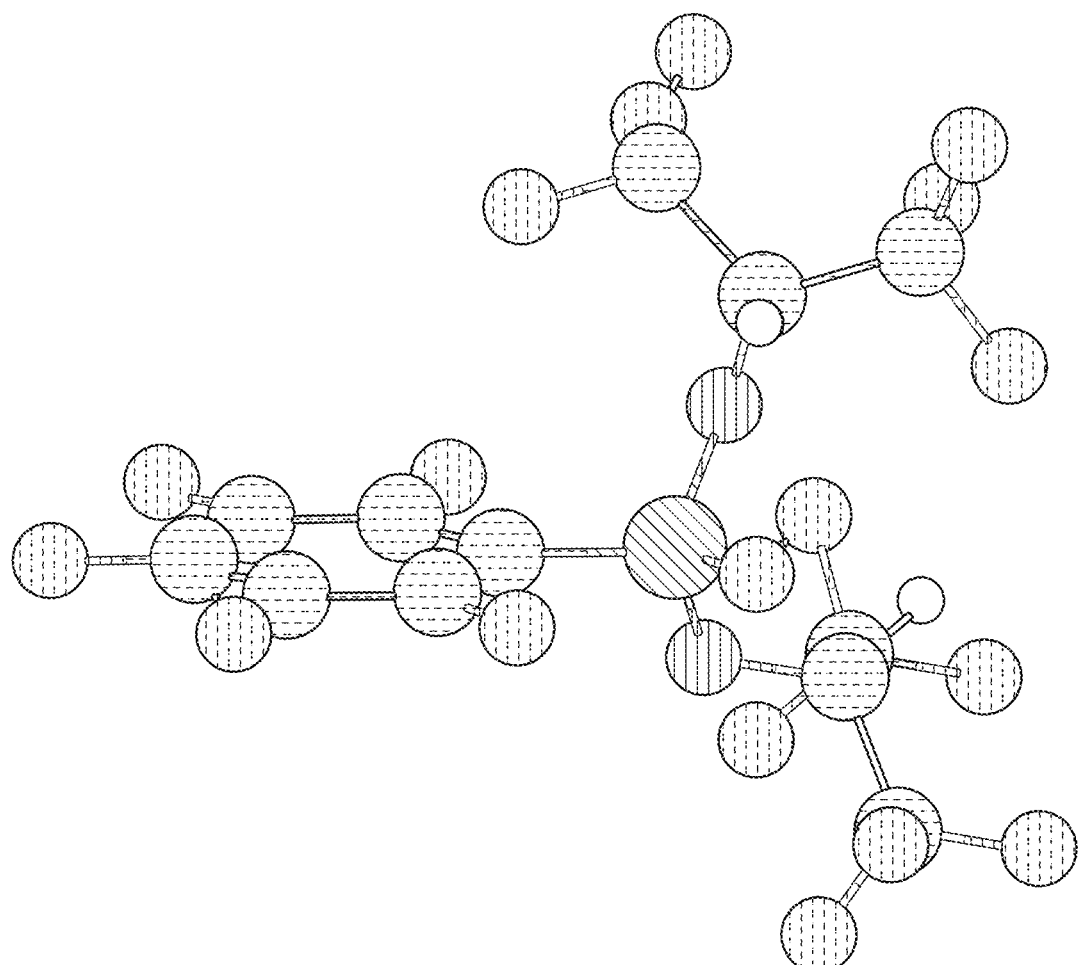
Figure 17F:
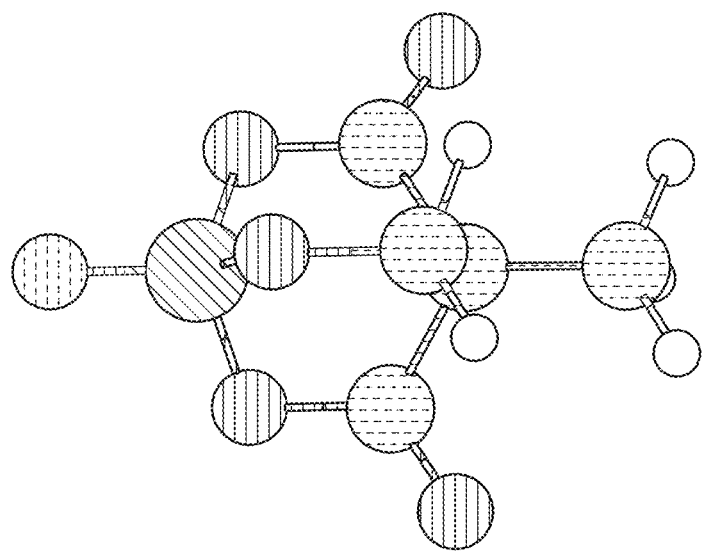

The dissolution process can be broken up into steps of a thermodynamic cycle, shown in FIG. 16.

$$LF(solid) \rightleftharpoons Li^+ + F^-; \quad (2)$$

$$Li^+ \rightleftharpoons Li^+(solv); \quad (3)$$

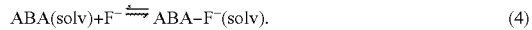

$$ABA(solv) + F^- \rightleftharpoons ABA\text{-}F^-(solv). \quad (4)$$

In the equations above, "(solv)" denotes solvation by the organic electrolyte; its absence means the species is in the gas phase. Standard states (1.0 M concentration) are assumed for $Li^+$ and $F^-$ ions, even when they are considered heuristically to exist in the gas phase. Gas phase contributions to entropy ultimately cancel in Equations 2-4 to recover Equation 1. The free energy change in the first step (Equation 2) describes solid LiF splitting into ions in the gas phase ($\Delta G_{LiF}$). The free energy for solvation of $Li^+$ ion (Equation 3) is quantified by $\Delta G_{solv\text{-}Li^+}$. The free energy in the last step (Equation 4) describes binding of solvated ABA to $F^-$ ($\Delta G_{F^-}$). The LiF solubility or dissolution constant (Equation 1) in the presence of different ABAs is defined as:

$$K_{diss} = \exp(-\Delta G_{diss}/k_B T), \quad (5)$$

$$= [Li^+][F^-], \quad (6)$$

where Boltzmann's constant ($k_B$) and the absolute temperature (T) define the energy scale, and the dimensionless ion concentrations are normalized by 1.0 M, consistent with the 1.0 M concentration reference systems in the calculations. As described below, corroborating experimental data demonstrates the improvement of electrolyte conductivity when ABAO is present.

Another anion receptor is a geometrically constrained boron ester. See D. Shanmukaraj et al., *J. Am. Chem. Soc.* 132, 3055 (2010). In traditional ABAs, the B atom exists in a planar, 3-coordinated geometry and exhibits $sp^2$ hybridization, but becomes $sp^3$ hybridized when bound to $F^-$, as shown in FIGS. 17A-F. The structural changes upon formation of the B—F bond lead to "reorganization energy" penalties (in analogy with electron transfer reactions) that reduce $F^-$ binding affinity ($\Delta G_{F^-}$). See T. A. Barnes et al., *J. Phys. Chem. C* 119, 3865 (2015); K. Leung, *Chem. Phys. Lett.* 568-569, 1 (2013); and G. Scalmaniand and M. J. Frisch, *J. Chem. Phys.* 132, 114110 (2010). Note that the analogy to electron transfer reorganization energy ($\lambda$) is only qualitative. $\lambda$ is obtained from the difference between vertical and adiabatic e-transfer. Nuclear degrees of freedom are frozen and allowed to relax in the two cases, respectively. In contrast, "vertical" $F^-$ binding with a frozen ABA configuration cannot be unambiguously defined. By constraining boron in a non-planar geometry even in the absence of $F^-$, one of the anion receptors of ABAT (shown in FIGS. 15F and 17F) is found to exhibit a gas phase $F^-$ binding affinity that exceeds those of planar boron molecules by more than 1 eV (~23 kcal/mol or 96 kJ/mol). Only the ABAT monomer is considered, not its dimerized/trimerized complexes.

For strong $F^-$ anion receptors like ABAT, explicit solvent molecules must be included to predict $F^-$ binding affinity. Consider the following possible intermediate steps toward LiF dissolution implicit in Equation 1:

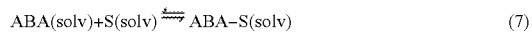

$$ABA(solv) + S(solv) \rightleftharpoons ABA\text{-}S(solv) \quad (7)$$

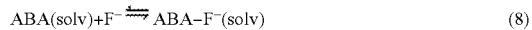

$$ABA(solv) + F^- \rightleftharpoons ABA\text{-}F^-(solv) \quad (8)$$

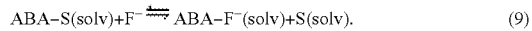

$$ABA\text{-}S(solv) + F^- \rightleftharpoons ABA\text{-}F^-(solv) + S(solv). \quad (9)$$

"S" is a solvent molecule at its liquid density. See D. M. Rogers et al., in *Annual Reports in Computational Chemistry*, ed. R. A. Wheeler, Elsevier, N.Y. vol. 8, ch. 4, PP. 71 (2012). Equation 8 (same as Equation 4) is pertinent to weak anion receptors that do not coordinate to "S." However, the affinities of ABA toward $F^-$ and solvent molecules tend to be correlated: electrophilic anion receptors that bind strongly to $F^-$ also naturally coordinate to organic solvent molecules with nucleophilic oxygen- and nitrogen-containing terminating groups. See G. Gomez-Jaimes and V. Barba, *J. Mol. Structure* 1075, 594 (2014). Equation 7 is thermodynamically favored by a substantial amount for ABAO and ABAT. Therefore, the exchange reactions of Equation 9 must be used to predict net $F^-$ binding free energies for these receptors instead of Equation 8. Such specific solvent binding effects can reduce the selectivity of different ABAs, and can even reverse the ordering of their $F^-$ binding affinity.

Therefore, DFT methods were used to survey the interactions of ABAs with four different solvent molecules, as shown in FIGS. 18A-I: acetonitrile ($CH_3CN$), dimethyl sulfoxide ($C_2H_6SO$, DMSO), dimethyl carbonate ($C_3H_6O$, DMC), and ethylene carbonate ($C_3H_4O_3$, EC). $CH_3CN$ is a standard solvent used for experimental and computational benchmarking. See Z. Chen and K. Amine, *J. Electrochem. Soc.* 156, A672 (2009); S. D. Han et al., *J. Electrochem. Soc.* 161, A2042 (2014); and K. Sodeyama et al., *J. Phys. Chem. C* 118, 4091 (204). DMSO is used in the synthesis of ABAs, as described below. EC and DMC are co-solvents in standard lithium ion battery electrolyte. Even after subtracting large offsetting ABA-S binding free energies, ABAO and ABAT are still predicted to be the most thermodynamically favorable $F^-$-binding receptors. In terms of kinetics, strong ABA-S interactions may hinder $F^-$ uptake.

In the theoretical literature, the word "solvent" has been used to describe very different types of solvation models. As described below, three treatments of solvation are described herein, which are different from the one applied in the literature. See Z. Chen and K. Amine, *J. Electrochem. Soc.* 156, A672 (2009).

Finally, the reorganization energy issue mentioned above is one reason that computational design and/or screening of $F^-$ anion receptor may be challenging unless $F^-$ ions, and in appropriate cases, solvent molecules, are explicitly included in the calculations. Several attributes of ABAO, ABAM, ABAT, ABA12, and ABAE, including several internal angles, their HOMO-LUMO gaps, and dipole moments, prior to binding to $F^-$ or solvent molecules, are compared below. No clear trend or linear correspondence between these attributes and the $F^-$ binding affinity is discernable. Thus the best way to computationally screen $F^-$ binding affinity is to include $F^-$ explicitly in the calculations.

Theoretical Studies of Boron-Based Anion Receptors

Gaussian Suite of Programs—

Most calculations are conducted using DFT with the PBE0 functional. See C. Adamoand and V. Barone, *J. Chem. Phys.* 110, 6158 (1999). The Gaussian (G09) suite of programs and a 6-31+G(d,p) basis are used for geometry optimization of molecular clusters and for computing zero-point-energy (ZPE)/finite temperature corrections. See Gaussian 09, Revision A. 1., M. J. Fritsch et al., Gaussian, Inc. Wallingford Conn. (2009). The final, single point energy of each cluster is evaluated using a 6-311++G(3df,2pd) basis at the optimized geometry.

In Equations 7, 8, 9, "ABA" can be ABAO, ABAM, ABAE, ABA12, ABA15, ABA21, or ABAT, and the solvent "S" can be either $CH_3CN$, DMC, DMSO, or EC. Here the number in ABA X refers to the ordering used by Chen and Amine. See Z. Chen and K. Amine, *J. Electrochem. Soc.* 156, A672 (2009). When Equation 8 is used, the ABA boron-site is not bonded to the solvent molecule. In contrast, on the right side of Equation 7 and the left side of Equation 9, a B—S chemical bond appears. In general, only the one solvent molecule that bonds covalently with boron appears in each calculation. In the case of $CH_3CN$, a larger explicit solvation shell is included as a check.

The polarizable continuum model (PCM) is used to approximate spectator solvent molecules in the outlying bulk electrolyte region surrounding the cluster made up of ABA and solvent molecule(s) in the G09 DFT simulation cell. See G. Scalmaniand and M. J. Frisch, *J. Chem. Phys.* 132, 114110 (2010). Various static dielectric constants (co) are used to mimic different experimental conditions. Since battery electrolytes typically consist of mixed solvents plus salt, $\varepsilon_O=40.0$ was applied to the outlying region of all these solvent molecules to mimic a uniform, high-dielectric liquid environment. Pure $CH_3CN$, DMSO, DMC, and EC solvents, with $\varepsilon_O$ taken to be 46.7, 35.7, 3.1, and 40.0, respectively, were also considered. EC is a solid and $\varepsilon_O$~40 is adopted to reflect a reasonable value for EC/DMC mixtures. Finally, each $CH_3CN$, DMSO, EC, DMC molecule, and $F^-$ anion at 1.0 M concentration, is assumed to occupy a volume of 86.7, 118, 111, 139, and 1668 Å$^3$, respectively. These values are deduced from densities/concentrations at room temperature. In the case of EC, the value comes from the solvent density at higher temperature. The volumes lead to small, <0.16 eV modifications of default translational entropies reported by the G09 software for pressure equal to 1 atm. standard state reaction gas phase conditions.

Different organic solvents solvate $Li^+$ to different extents (Equation 3), and $Li^+$ solvation free energies are calculated using $Li^+S_4$ clusters, with "S"=$CH_3CN$, EC, DMSO, and DMC. Four explicit solvent molecules are included because $Li^+$ is generally 4-coordinated in polar solvents. See S. D. Han et al., *J. Electrochem. Soc.* 161, A2042 (2014); S. Yanase and T. Oi, *J. Nucl. Sci. Tech.* 39, 1060 (2002); Y. Wang and P. B. Balbuena, *Int. J. Quant. Chem.* 102, 724 (2005); K. Leung and J. L. Budzien, *Phys. Chem. Chem. Phys.* 12, 6583 (2010); S. B. Rempe et al., *J. Am. Chem. Soc.* 122, 966 (2000); T. M. Alam et al., *Phys. Chem. Chem. Phys.* 13, 13629 (2011); and P. E. Mason et al., *J. Phys. Chem. B* 119, 2003 (205). In all cases, results associated with the bare, unsolvated $F^-$ are described. These unsolvated $F^-$ ions appear only in intermediate steps in the calculations, not the final result (Equation 1). The anion is expected to exist either as LiF solid or ABA-F. The one instance where the free energy of solvated $F^-$ is needed is when predicting LiF solid solubility in liquid electrolyte in the absence of ABAs, for comparison purposes. Even in this case, $F^-$ should exist as $(Li^+)n/(F^-)n$ aggregates (e.g., as shown in FIG. 28H and FIG. 28I).

Putting these considerations together, the total LiF dissolution reaction free energies ($\Delta G_{diss}$) in Equation 1 are calculated using either of the following equations:

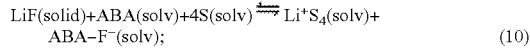
$$LiF(solid) + ABA(solv) + 4S(solv) \rightleftharpoons Li^+S_4(solv) + ABA\text{-}F^-(solv); \quad (10)$$

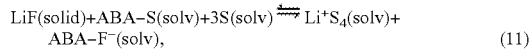
$$LiF(solid) + ABA\text{-}S(solv) + 3S(solv) \rightleftharpoons Li^+S_4(solv) + ABA\text{-}F^-(solv), \quad (11)$$

depending on whether the ABA in question forms a thermodynamically stable complex with the solvent "S."

To assess basis set superposition effects (BSSE) when using the 6-311++G(3df,2pd) basis, standard BSSE corrections are calculated for four gas reactions: ABAO+EC→A-BAO-EC, ABAM+EC→ABAM-EC, ABAO+$F^-$→ABAO-$F^-$, and ABAM+$F^-$→ABAO-$F^-$. The values are 0.07, 0.07, 0.15, and 0.15 eV, respectively. Thus BSSE does not appear to change the preference for EC and $F^-$ binding among different ABAs. The maximum impact on net ABAO-$F^-$ binding, via Equation 9, is 0.08 eV, or $-3\ k_BT$. Since it has been suggested that BSSE calculations can be overestimated, and such calculations cannot be performed in the presence of a dielectric environment (PCM solvation method, see below, which should contract the $F^-$ electron cloud and reduce BSSE), BSSE calculations were not conducted for other ABA's and solvent molecules. See L. M. Menteland and E. J. Baerends, *J. Chem. Theory Comput.* 10, 252 (2014); and S. D. Han et al., *J. Electrochem. Soc.* 161, A2042 (2014).

Solvation Models—

It is important to distinguish explicit versus implicit solvent treatments in atomistic length-scale simulations. Most electronic structure (e.g., quantum chemistry or DFT) calculations involve localized basis sets, and a small molecular cluster representing the chemical reaction zone. The cluster is relaxed to its most stable atomic configuration as though it is at zero temperature (T=0 K). The effect of a finite temperature is typically approximated, post-processing, using a harmonic expansion to account for vibrational motion and by adding translational/rotational entropies. See S. B. Rempe and H. Jonsson, *The Chemical Educator* 3, 1 (1998). The outlying region containing liquid solvent is treated implicitly, using dielectric continuum (solvation reaction field) methods. See G. Scalmaniand and M. J. Frisch, *J. Chem. Phys.* 132, 114110 (2010). If the cluster or reaction zone contains no explicit solvent molecule, the solvation treatment is henceforth de-scribed as "type 1." If at least one solvent molecule is included, it is described as "type 2."

The type 1 and type 2 solvations are described below. In most cases, one explicit solvent molecule is included. This is reasonable because only one solvent molecule can covalently bond to the boron site. Solvent binding causes extensive geometric changes in most ABAs, as shown in FIGS. 18A-I. Even such a purely continuum approach (type 1) has predicted that the solvent reduces the differential affinity for $F^-$ ($\Delta\Delta G\ F^-$) among different ABA's, defined as the $\Delta G_{F^-}$ change when switching from one ABA to another (Equation 4), by approximately 25% compared to gas phase $\Delta\Delta G_{F^-}$. See K. Leung et al., *J. Electrochem. Soc.* 162(9), A1927 (2015). However, type 1 solvation does not yield the correct geometry changes in ABA, as shown in FIGS. 18A-I. Including an explicit solvent molecule is crucial for strong anion receptors, and can lead to a large modification of $F^-$-binding free energy.

VASP Calculations—

To compute the zero temperature total energy of LiF solid, the VASP code, PAW pseudopotentials, and PBE0 functional are applied in plane-wave-based DFT calculations carried out in periodic boundary conditions. See G. Kresseand and G. Furthmuller, *Phys. Rev. B* 54, 11169 (1996); J. Paier et al., *J. Chem. Phys.* 127, 024103 (2007); G. Kresseand and J. Joubert, *Phys. Rev. B* 59, 1758 (1999); and C. Adamoand and V. Barone, *J. Chem. Phys.* 110, 6158 (1999). The commonly used hybrid PBE0 functional is chosen because it is implemented in both G09 and in VASP. An energy cutoff of 500 eV for plane waves and a $10^{-5}$ eV wavefunction convergence criterion are enforced. The optimal lattice constant (4.02 Å) and cohesive energies are calculated in a face-centered cubic cell with a 2-atom unit cell and 4×4×4 Monkhorst-Pack Brillouin sampling. LiF phonon dispersions are then computed to estimate finite temperature corrections in the harmonic approximation. Phonon calculations apply the same settings, except that a 512-atom (16.08 Å)³ supercell with F⁻ point sampling is applied and the less expensive PBE functional is used for this larger simulation cell. See J. P. Perdew et al., *Phys. Rev. Lett.* 77, 3865 (1996). A finite difference approach is applied to calculate vibrational force constants. This yields the dynamical matrix, the eigenvalues of which are vibrational frequencies ($\omega$). See P. Giannozzi et al., *Phys. Rev. B* 43, 7231 (199). The vibrational correction to the free energy is:

$$\Delta G_{harm} = 1/\beta \sum_i \int_k dk \log[2\sinh(\beta \hbar \omega_{k,i}/2)], \quad (12)$$

where $\beta$ is the inverse thermal energy ($1/k_B T$), $\hbar$ is Planck's constant, {k} spans the Brillouin zone, and i is the composite index for the 6 eigenvalues $\omega_{k,i}$ of the dynamical matrix at each k-point. Equation 12 yields a small, 0.067 eV thermal contribution. Therefore, improvement to the phonon calculation was not pursued, e.g., via using the more accurate hybrid PBE0 functional.

Experimental Method—

Anion binding agents were synthesized using previously reported methods and tested for electrochemical performance. See L. F. Li et al., *J. Power Sources* 189, 539 (2009). The anion receptors considered include ABAO (IUPAC name: 2-(perfluorophenyl)-1,3,2-dioxaborolane-4,6-dione), ABAM (IUPAC name: 2-(perfluorophenyl)-1,3,2-dioxaborinane-4,6-dione), and a pinacol-based ABA (IUPAC name: 4,4,5,5-tetramethyl-2-(perfluorophenyl)-1,3,2-dioxaborolane) equivalent to ABA15 considered by Chen and Amine. See Z. Chen and K. Amine, *J. Electrochem. Soc.* 156, A672 (2009). One additional step was executed to remove DMSO, used in synthesis, from the resulting products. All solids were re-dissolved in acetone with an excess of LiF. Undissolved LiF was removed by syringe filtration (2 µm) and the filtrate condensed by slow evaporation in air.

Electrochemical cells were assembled using 2032 coin cells, which utilized stainless steel electrodes separated with a polyimide spacer to ensure a uniform electrode separation. Electrolytes were composed of 3:7 (wt %) ethylene carbonate/ethyl methyl carbonate (EC:EMC) and 1.0 M ABA. Equivalents of 1.0 M LiF crystals were added to each electrolyte solution. All solutions were stirred thoroughly, but the total LiF content in solution was variable based upon the efficiency of fluoride binding by the ABA molecules. Lower affinity binding agents resulted in solutions that were much lower concentration than 1 M after filtration. Approximately 1 mL of electrolyte for each of the tested binding agents was flooded into the coin cell prior to sealing the cell shut. This was done to ensure that there was complete flooding of the electrochemically accessible area for both electrodes. Conductivity was determined using a Solartron 1287 and 1260 stack by measuring the AC impedance in the frequency range of 100 kHz to 0.1 Hz. The peak-to-peak voltage of the AC signal was limited to 5 mV to avoid any distortion in the response.

X-ray single-crystal data collection was conducted using a Bruker APEX/CCD diffractometer (Mo K$\alpha$, $\lambda$=0.71073 Å). Indexing and frame integration were performed using the APEX-II software suite. Absorption correction was performed using SADABS (numerical method) also within the APEX-II software. The structures were solved and refined using SHELXS-97 contained in SHELXTL v6.10 packages.

Theoretical Studies of Boron-Based Anion Receptors

Oxalate and boron ester ABA's are good anion receptors—Table 2 lists the predictions for ABAO, ABAT, and re-examines several fluoride receptors explored by Chen and Amine. See Z. Chen and K. Amine, *J. Electrochem. Soc.* 156, A672 (2009). F⁻-binding free energies either in vacuum (E0=1), or with type 1 solvation using a polarizable dielectric continuum (PCM) implicit solvent model (Equation 8) Are described first. The gas phase binding enthalpy (not shown) are comparable to those reported by Qin et al., although a somewhat different basis set is used compared with that work so as to be compatible with methods used for ABAO and ABAT herein. See Y. Qin et al., *J. Phys. Chem. C* 114, 15202 (2010). For a first estimation of solvation effects, $\varepsilon_O$ is set to 40 to mimic a generic high dielectric liquid environment. As discussed above, for the purpose of this calculation, F⁻ is not solvated, and its energetic contribution is constant for all ABAs and solvents.

In vacuum (first row of Table 2), ABAO binds more strongly to F⁻ than almost all other ABA X's, even those with multiple —$C_6F_5$ electron-withdrawing groups. The exception is ABAT, which is by far the most fluorophilic. As discussed above, ABAT alone has its boron atom in a non-planar geometry in its F⁻-free state and is less adversely affected by the reorganization energy cost when binding F⁻. When only the solvent dielectric continuum is added (second row of Table 2), the $\Delta G_{F^-}$ ordering remains largely unchanged. It is of interest to compare ABA12 and ABA15, which differ only by their —$CF_3$ and —$CH_3$ groups. The electron-withdrawing —$CF_3$ groups stabilize the F⁻ binding by 0.884 eV (20.4 kcal/mol) over ABA15.

TABLE 2

F⁻ and CH₃CN ("S") binding free energies with various ABAs computed using Equations 7-9, in units of eV (~96 kJ/mol). No explicit solvent is present except in the last two rows (ABA-S and ABA-F⁻*), where one CH₃CN is coordinated to the ABA boron site and Equation 9 (instead of Equation 8) is used to compute F⁻ binding free energy. ABA12 and ABA15 fail to bind to CH₃CN in the calculations.

|  | ABAO | ABAM | ABAE | ABA12 | ABA15 | ABA21 | ABAT |
|---|---|---|---|---|---|---|---|
| ABA-F⁻ ($\varepsilon_0 = 1$) | −4.396 | −4.171 | −4.128 | −3.741 | −2.679 | −4.234 | −5.411 |
| ABA-F⁻ ($\varepsilon_0 = 40$) | −5.962 | −5.650 | −5.660 | −5.450 | −4.566 | −5.581 | −7.238 |
| ABA-S ($\varepsilon_0 = 40$) | −0.249 | −0.002 | −0.069 | NA | NA | −0.034 | −1.533 |
| ABA-F⁻*($\varepsilon_0 = 40$) | −5.714 | −5.648 | −5.591 | −5.405 | −4.521 | −5.547 | −5.705 |

Including Explicit CH$_3$CN Solvent Molecule(s)—

Figure 15A:
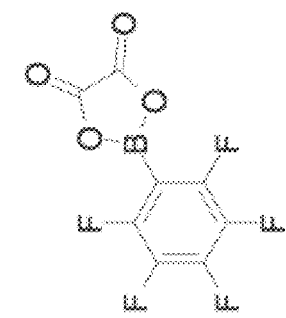
FIGS. 15A-F are schematic illustrations of structures of (A) oxalic (ABAO), (B) malonic (ABAM), and (C) maleic (ABAE) acid-based ABAs; phenyl boron-based (D) ABA12, and (E) ABA21, and (F) ABAT. The number in ABA12 and ABA21 refers to the ordering used in by Chen and Amine. Boron atoms are $sp^2$ hybridized and reside in planar geometries except in ABAT, where B protrudes slightly out of the plane formed by three O atoms.
Figure 15B:
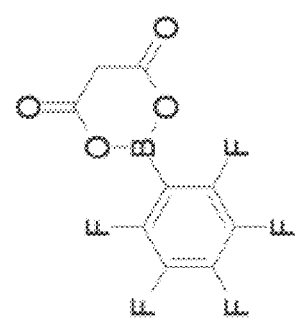
Figure 15C:
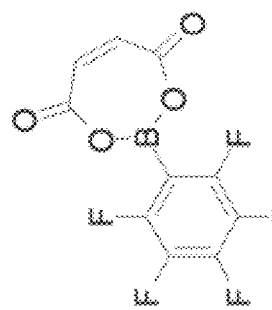
Figure 15D:
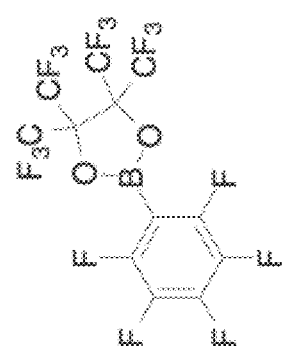
Figure 15E:
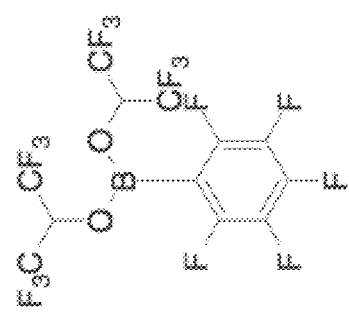
Figure 15F:
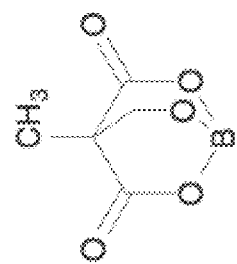

Free energies computed using Equation 8 may overestimate F$^-$-binding in polar solvents because the boron site may bond to solvent molecules. Next, the effect of an explicit CH$_3$CN solvent molecule coordinated to these ABA's (last two rows of Table 2) is examined. FIGS. 18A, B, and C illustrate the optimized, most enthalpically favorable geometries of ABA-CH$_3$CN at $\varepsilon_O$=40.0. The N-atom terminus of the solvent coordinates to the boron site, just like F$^-$, leading to sp$^3$-hybridization of the B— atom and significant distortion of the molecular geometries compared with unbound ones (as shown in FIGS. 15A and B). Such distortions are not observed when type 1 solvation treatment is used.

The solvent coordination reactions, ABAO+CH$_3$CN $\Leftrightarrow$ ABAO–CH$_3$CN and ABAM+CN$_3$CN$\Leftrightarrow$ABAM–CH$_3$CN, exhibit free energy changes of –0.249 eV and –0.002 eV, respectively. CH$_3$CN binding to ABAO is therefore exothermic while it is almost thermoneutral for ABAM. Note that the zero temperature binding enthalpies to CH$_3$CN are favorable in both cases: –0.642 eV and –0.417 eV for ABAO and ABAM, respectively. As is typical of A+B$\Leftrightarrow$C reactions, the translational and rotational entropy penalties add up to more than 0.4 eV. They negate, or almost negate, the substantial favorable reaction enthalpies. ABAE and ABA21 also exhibit small CH$_3$CN binding free energies.

Since ABAO binds favorably to CH$_3$CN, Equation 9 should be used to examine F$^-$ binding affinity. With the explicit solvent contribution added, the F$^-$-affinity ($\Delta G_{F^-}$) of ABAO lessens from –5.965 eV to –5.714 eV. For ABAM, $\Delta G_{F^-}$ is almost unmodified, becoming –5.648 eV (Table 2). Inclusion of explicit solvent therefore reduces the differential F$^-$ affinity ($\Delta\Delta G_{F^-}$) between ABAO and ABAM from ~0.31 eV to ~0.07 eV. Even so, ABAO remains a slightly better F$^-$ receptor. The F$^-$-binding affinity of ABAE and ABA21 are slightly reduced when an explicit CH$_3$CN is included in the calculations. ABA12 and ABA15 do not bind to CH$_3$CN: even metastable ABA12-CH$_3$CN and ABA15-CH$_3$CN structures cannot be optimized with $\varepsilon_O$=40 in the calculations. Hence Equation 8 should be used instead and their $\Delta G_{F^-}$ remains unchanged; and explicit CH$_3$CN should not be present in these models.

ABAT binds strongly to acetonitrile. The free energy associated with Equation 7 is –1.533 eV (–35 kcal/mol). If an explicit CH$_3$CN is not used in the calculations, the F$^-$-binding affinity would be overestimated by this amount. This translates into a 6×10$^{24}$ fold error in the equilibrium dissolution constant (K$_{diss}$, Equation 5). Subtracting Equation 7 from Equation 8 yields Equation 9, from which $\Delta G_{F^-}$ drastically drops from –7.238 eV to –5.705 eV. With this significant modification due to explicit solvent effects, the F$^-$ binding affinities of ABAO and ABAT in CH$_3$CN become almost identical, despite the large gas phase disparity.

More solvent molecules can be added to evaluate Equation 8. FIG. 28G illustrates six CH$_3$CN in the first solvation shell of ABAO, in addition to the use of the PCM dielectric surrounding the explicit solvent region. The F$^-$ binding enthalpies, without vibrational corrections, are predicted to be –5.620 eV and –5.570 eV with one and six CH$_3$CN, respectively. They are within 50 meV of each other. When thermal and zero-point corrections are included, a slightly larger 80 meV difference is predicted. This is likely because the additional CH$_3$CN are only weakly coordinated to the ABAO-CH$_3$CN complex, yet the ABA-solvent interactions are still treated as harmonic vibrational modes. This approximation can lead to overestimated zero-point energy corrections that do not completely cancel in the reactants and products. Nevertheless, the predictions are sufficiently similar with 1 and 6 solvent molecules that only one explicit molecule is considered in all following calculations.

Survey of Other Solvent Molecules, with ABAO, ABAM, and ABA T—

DMSO is used during the synthesis of ABAO, and it exhibits the highest ABA-binding free energies among solvents examined (as shown in Table 3). FIGS. 19A and 19B depict the X-ray crystal structure of ABAO-DMSO prior to solvent exchange, and after DMSO is replaced by F$^-$. The before-exchange (FIG. 19A) reconstruction clearly demonstrates that the boron site becomes sp$^3$ hybridized due to formation of a covalent bond with the oxygen site of DMSO. This hybridization remains after F$^-$ substitutes for DMSO. There are also some extra materials not expected for this reconstruction post DMSO solvent-exchange (FIG. 19B). This is due to residual material that remains within the crystal structure during the evaluation. The software assigns lithium to the residual electron density remaining within the sample. The X-ray reconstruction in FIGS. 19A and B is sufficient to demonstrate the definitive change from DMSO-boron interaction to fluorine-boron interaction when an aggressive solvent exchange is conducted. Without this exchange, the primary reaction site for these ABA would be bound to solvents and unavailable for use to scavenge LiF during battery operation.

TABLE 3

F$^-$- (ABA-F) and solvent-binding (ABA-S) free energies, Li$^+$ solvation free energies computed with an explicit solvent shell of 4 molecules (Li$^+$S$_4$), and sum of these two (ABA-F/Li$^+$), in eV units (~96 kJ/mol). In the case of F$^-$, the asterisk refers to the corrected binding free energies (Equation 9) if the ABA binds to the solvent molecule (i.e., Equation 8 yields an attractive free energy). The ABA15-F/Li$^+$ value in EC solvent ($\varepsilon_o$ = 40) is –8.926 eV. The cis- trans DMC conformation is most favorable when bound to ABA's.

|  | CH$_3$CN | DMSO | DMC | EC |
|---|---|---|---|---|
| $\varepsilon_o$ | 35.7 | 46.7 | 3.1 | 40.0 |
| ABAO-F | –5.958 | –5.968 | –5.496 | –5.962 |
| ABAM-F | –5.637 | –5.653 | –5.215 | –5.650 |
| ABAT-F | –7.232 | –7.245 | –6.672 | –7.238 |
| ABAO-S | –0.248 | –0.686 | –0.087 | –0.114 |
| ABAM-S | –0.001 | –0.414 | –0.139 | +0.083 |
| ABAT-S | –1.532 | –2.059 | –1.346 | –1.450 |
| ABAO-F* | –5.710 | –5.282 | –5.409 | –5.848 |
| ABAM-F* | –5.636 | –5.239 | –5.076 | –5.650 |
| ABAT-F* | –5.700 | –5.186 | –5.326 | –5.788 |
| Li$^+$S$_4$ | –4.746 | –5.008 | –2.195 | –4.445 |
| ABAO-F/Li$^+$ | –10.456 | –10.290 | –7.604 | –10.293 |
| ABAM-F/Li$^+$ | –10.382 | –10.247 | –7.271 | –10.095 |
| ABAT-F/Li$^+$ | –10.446 | –10.194 | –7.521 | –10.223 |

The DMSO-bound ABAO structure predicted from DFT (shown in FIG. 18E) looks similar to FIG. 19A, except that the DMSO molecule is rotated so that one of its —CH$_3$ protons coordinates to an F$^-$ on the phenyl ring. Since the calculation only contains one ABAO-DMSO complex, and omits explicit representation of the surrounding molecules to which DMSO can coordinate in the X-ray spectrum sample, the difference is understandable. The rotational conformational difference is not expected to lead to a significant change in the predicted energy.

Table 3 shows that, at room temperature, both ABAO-DMSO and ABAM-DMSO complexes are favorable. Even after subtracting the free energy cost of breaking the ABA-DMSO bond to form ABA-F (i.e., using Equation 9 rather than Equation 8), ABAO retains a slight preference for F⁻-binding relative to ABAM in DMSO, while ABAT is slightly inferior to ABAO by ~0.1 eV.

Other solvents like DMC and EC have smaller specific solvent effects than DMSO (Table 3). EC exhibits an unfavorable binding free energy with ABAM. Therefore, ABAM should retain its planar geometry, and type 1 dielectric continuum (Equation 10) calculations suffice for this ABA. In contrast, ABAO binds to all solvents. So does ABAT, which exhibits much larger binding free energies than ABAO. After subtracting the solvent-coordination effects, ABAT is predicted to be only slightly inferior to ABAO for binding F⁻.

LiF Ionization and Li⁺ Solvation Free Energies—

Using the VASP code, the free energy of splitting LiF solid into Li⁺ and F⁻ ions in the gas phase ($\Delta G_{LiF}$, Equation 2) is found to be 10.098 eV per formula unit. This includes finite temperature corrections due to solid state vibrational motion at T=300 K (Equation 12) and the translational entropy gained by Li⁺ and F⁻ corrected to 1.0 M concentration, even though the ions are assumed to be in gas phase in calculations associated with Equation 2. Gas phase entropic contributions cancel in the final results. Li⁺ solvation free energies are also needed in dissolution predictions. With Li⁺ S₄ clusters and the PCM dielectric continuum approximation outside the cluster, Li⁺ solvation free energies ($\Delta G_{solv}$-Li⁺, Equation 3) in CH₃CN, DMSO, DMC, and EC are predicted to be −4.746 eV, −5.008 eV, −2.195 eV, and −4.445 eV, respectively, when computed at the respective $\varepsilon_O$ of the pure solvent (Table 3). The EC result is consistent with earlier predictions of gas phase energy changes for LiF splitting and Li solvation. See E. Jonsson and P. Johansson, *Phys. Chem. Chem. Phys.* 14, 10774 (2012). Note that the DMC solvation value may be underestimated by a small fraction of an electron volt due to the neglect of the significant quadrupolar solvent contributions in the PCM dielectric continuum treatment, which is specific to this molecule. See T. A. Barnes et al., *J. Phys. Chem. C* 119, 3865 (2015); and N. Sai et al., *J. Phys. Chem. Lett.* 3, 2173 (2012). However, F⁻-binding to ABA in DMC is so much less favorable than in other solvents (Table 3) that this small solvation error should not affect the qualitative conclusions below.

LiF Solubility Predictions—

The dissolution free energies ($\Delta G_{diss}$) according to Equation 10 or 11 can now be calculated by adding $\Delta G_{F⁻}$, $\Delta G_{solv-Li⁺}$ (the last rows of Table 3), and $\Delta G_{LiF}$=10.098 eV. A negative $\Delta G_{diss}$ means that LiF dissolution is thermodynamically favorable. From Table 3, LiF should be mostly soluble in 1.0 M ABAO, ABAM, and ABAT in the presence of CH₃CN, DMSO, and EC. The exceptions are ABAM in EC and ABAT in EC and DMSO, where the solubility estimates are within the margin of computational uncertainties. Even though the most advanced DFT functionals have not been applied, the uncertainty of the computational method is unlikely to exceed a few tenths of an eV, while $\Delta\Delta G_{diss}$'s between different ABA's should be much more reliable than that.

It is challenging to relate the predicted dissolution enthalpy (or free energy) to absolute solubility. See K. Tasaki et al., *J. Electrochem. Soc.* 156, A1019 (2009); and K. Tasaki and S. J. Harris, *J. Phys. Chem. C* 114, 8076 (2010). Here the solubility for a binary compound like LiF is estimated via $(K_{diss})^{0.5}$ (Equation 6). EC molecules are the closest approximation to the electrolyte used in the experiments (an EC/EMC mixture) among the solvents examined in the modeling. For ABAO-F⁻/EC, Equation 11 yields $K_{diss}$=exp(−(−10.293+10.098) eV/$k_B$T). This translates into a 43.3 M solubility. The value is unphysically high because the calculations assume infinite Li⁺ and ABAO-F⁻ dilution (i.e., ideal solution with unit solute activity) and neglect steric and electrostatic repulsion between like-charged ions. Inherent approximations in DFT functionals may also contribute to the extremely high value.

Nevertheless, the prediction of high LiF solubility in ABAO is consistent with the measured high mobility (as shown in FIG. 20). With ABAM-F⁻, the solubility is predicted to be a much lower 0.94 M. This value may again be overestimated. However, the trend that LiF solubility decreases going from ABAO to ABAM is qualitatively consistent with the reduced ABAM conductivity.

LiF solubility in ABA15 (not listed in Table 3) has also been considered. $\Delta G_{solv-Li⁺}$ and $\Delta G_{F⁻}$ sum to −8.966 eV in the presence of ABA15 with the EC-appropriate $\varepsilon_O$=40 for type 1 solvation. The ABA15-assisted Li⁺/F⁻ solubility in EC is predicted to be 1.5×10⁻¹⁰ M. Hence ABA15 is not expected to contribute to dissolution of LiF solid. The measured LiF solubility and conductivity in ABA15 may in fact reflect properties in the absence of any ABA.

LiF solubility in the absence of ABA is therefore needed for comparison purposes. If Li⁺ and F⁻ are treated as well-separated solvated species surrounded by a dielectric continuum, the predicted solubility is a miniscule, unphysical 10⁻¹⁶. This indirectly suggests that Li⁺ and F⁻ must form ionic aggregates. Consider the two smallest charge-neutral aggregates, a Li⁺/F⁻ contact ion pair (shown in FIG. 18H) and a Li₂F₂ cluster (shown in FIG. 18I). Three (3) and four (4) EC molecules are added to these clusters, respectively, to keep all Li⁺ 4-coordinated to either EC or F⁻. The LiF dissolution reactions in the absence of ABAs can be written as the respective cycles:

$$\text{LiF(solid)} \rightleftharpoons \text{LiF(gas)}, \quad (13)$$

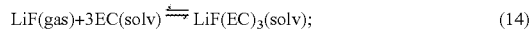

$$\text{LiF(gas)} + 3\text{EC(solv)} \rightleftharpoons \text{LiF(EC)}_3\text{(solv)}; \quad (14)$$

and

$$2\text{LiF(solid)} \rightleftharpoons \text{Li}_2\text{F}_2\text{(gas)}, \quad (15)$$

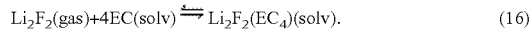

$$\text{Li}_2\text{F}_2\text{(gas)} + 4\text{EC(solv)} \rightleftharpoons \text{Li}_2\text{F}_2(\text{EC}_4)\text{(solv)}. \quad (16)$$

Solid state sublimation energies and liquid state solvation free energies are computed using the VASP and G09 codes. The resulting $\Delta G_{diss}$ for formation of a LiF contact ion pair is predicted to be +0.986 eV, which translates into a 5.3×10⁻⁹ M effective LiF solubility. This ion-pair solubility value is already larger than that computed for Li⁺ and F⁻ solvation via formation of ABA15-F⁻ complexes. For Li₂F₂, $\Delta G_{diss}$ is +1.444 eV, which yields a 8.7×10⁻⁷ M solubility when $(K_{diss})^{0.25}$ is used to represent [Li⁺] and [F⁻] solubility. This is orders of magnitude higher than the contact ion pair value. The overall trend suggests that ion aggregates may be responsible for much of the LiF solubility in the absence of ABAs.

Using molecular dynamics simulations based on classical force fields, Tasaki et al. also predicted unfavorable heats of solvation for LiF solid in DMC and EC solvents in the absence of ABAs. See K. Tasaki et al., *J. Electrochem. Soc.* 156, A1019 (2009); and K. Tasaki and S. J. Harris, *J. Phys. Chem. C* 114, 8076 (2010). A direct comparison between these predictions and the present results is difficult because different reference states are used. Unlike Li⁺ and F⁻, bulky ABA molecules are not likely to form aggregates, except for the constrained boron ester ABAT. See D. Shanmukaraj et al., *J. Am. Chem. Soc.* 132, 3055 (2010).

Conductivity Measurements, Experimental Estimates of Solubility, and Comparison to DFT Modeling—

FIG. 20 shows the electrolyte conductivity measured in the coin cells as a function of temperature. ABAO exhibits the highest conductivity at all temperatures, while ABAM is a factor of 2-3 lower. The conductivity in ABA15 is negligible. Electrolyte conductivity should be strongly correlated with the ability of the electrolyte to dissolve LiF. The observed conductivity trend is therefore qualitatively consistent with the predicted ABAO>ABAM>ABA15 LiF solubility described above.

To make a semi-quantitative estimate of the amount of lithium in solution when ABA15 is present, it was assumed that the conductivity varied with concentration, similar to other battery electrolyte systems. See M. S. Ding et al., *J. Electrochem. Soc.* 148, A1196 (2001); and J. P. Southall et al., *Solid State Ionics* 85, 51 (1996). The conductivity of the ABAO solutions was assumed to be maximized for the purpose of this analysis (i.e., all LiF added was dissolved, yielding a 1.0 M concentration). Also, ABAO was used as a reference for the ABA15 solution. Conductivities were then approximated using a fourth order polynomial fit. See M. S. Ding et al., *J. Electrochem. Soc.* 148, A1196 (2001). The concentration of dissolved LiF that was calculated in solution using this evaluation for the ABA15 solution was approximately $5 \times 10^{-4}$ mol/L. This represents a large reduction in overall fluoride binding affinity for ABA15 over the other demonstrated binding agents. As described above, the estimated $5 \times 10^{-4}$ mol/L LiF solubility in the ABA15 solution is likely due to $Li^+$ and $F^-$ ions and their ionic aggregates, and not due to ABA15-$F^-$ complexation.

Tasaki et al. reported that the LiF concentration in neat DMC is $1.7 \pm 0.4 \times 10^{-4}$ mol/L, or $4 \pm 1$ ppm after filtration through 2 μm filter. See K. Tasaki et al., *J. Electrochem. Soc.* 156, A1019 (2009). This is slightly lower but is of the same order of magnitude as the $5 \times 10^{-4}$ mol/L solubility estimated for EC/EMC/apparently-inert ABA15. EC/DMC has a higher dielectric constant and is expected to be a better solvent for LiF dissolution. Hence these measurements are broadly consistent with each other.

Jones et al. have shown that LiF solubility in the absence of ABAs can strongly depend on whether filtration was performed, and on the filtering pore sizes. See J. Jones et al., *Fluid Phase Equ.* 305, 121 (2011). Without filtering, LiF solubility in DMC was reported at $2.2 \times 10^{-2}$ mol/L, more than 100 times higher than post-filtering. See K. Tasaki et al., *J. Electrochem. Soc.* 156, A1019 (2009). Large pore sizes in filtering crucible also increase the apparent LiF solubility. The solubility of LiF in EC or EC mixtures was only reported without filtering, and a direct comparison with filtered DMC/LiF solutions cannot be made.

The study of Jones et al. appears to confirm the role of LiF ionic aggregates in LiF solubility. See J. Jones et al., *Fluid Phase Equ.* 305, 121 (2011). As described above, LiF solubility increases as the end product varies from isolated $Li^+$ and $F^-$, to LiF pairs, to $Li_2F_2$ clusters, although there remains a substantial difference between the cluster sizes considered in theory and experimental pore sizes. Quantitatively, the DFT-predicted LiF solubility of $8.7 \times 10^{-7}$ M remains substantially below the experimental estimate of $\sim 5 \times 10^{-4}$ M. However, the discrepancy is expected to shrink as larger clusters are considered in DFT calculations.

Conclusions for Theoretical Studies of Boron-Based Anion Receptors

Using both DFT predictions and conductivity measurements, the oxalate-based ABA ("ABAO") has LiF-solvation properties that make it a promising fluoride receptor for primary carbon monofluoride (CFx) batteries. The suitability of this anion receptor in other batteries like lithium-ion or lithium-air may depend on factors other than LiF conductivity, such as its interaction with $PF_6^-$, which is not present in primary batteries. See Y. Qin et al., *J. Phys. Chem. C* 114, 15202 (2010). However, the solvent effects described herein have general interest in liquid electrolyte-based energy storage devices beyond CFx.

After accounting for explicit solvent effects, the equilibrium constant $K_{diss}$ for the reaction with ABAO:

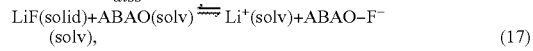

$$\text{LiF(solid)} + \text{ABAO(solv)} \rightleftharpoons \text{Li}^+(\text{solv}) + \text{ABAO-F}^-(\text{solv}), \quad (17)$$

is the largest among the ABAs tested. The trend is confirmed by explicitly comparing the conductivity of three ABAs that have been synthesized and tested. The predicted LiF solubility in ABAO is at least comparable to that of a recently proposed ABAT with the boron atom in a non-planar environment, after specific solvent effects are taken into account. See D. Shanmukaraj et al., *J. Am. Chem. Soc.* 132, 3055 (2010). Indeed, for these strong $F^-$-binding anion receptors, including explicit ABA-S covalent bonding for different choices of solvent is crucial. Omitting the solvent molecule in the calculations can lead to ABA-$F^-$ binding coefficients that are in error by many orders of magnitude. The results therefore emphasize the importance of considering explicit $F^-$ and solvent-molecule binding in calculations when conducting computational design/screening of an-ion receptors. In the absence of ABAs, LiF dissolves in cyclic carbonate organic solvents mostly through the formation of ionic aggregates; isolated and well-solvated $Li^+$ and $F^-$ species likely exist at low concentrations in LiF solutions.

The present invention has been described as organosilicon-based electrolytes for long-life primary lithium batteries. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A lithium battery, comprising:
an anode comprising lithium metal;
a cathode comprising carbon monofluoride;
a separator between the anode and the cathode;
an organosilicon-based electrolyte for conducting lithium ions between the anode and the cathode, the electrolyte comprising a siloxane or silane backbone and an anion binding agent ligand bonded to the siloxane or silane backbone.

2. The lithium battery of claim 1, wherein the electrolyte further comprises a polyethylene oxide side chain grafted to the siloxane or silane backbone.

3. The lithium battery of claim 1, wherein the anion binding agent comprises a boron-based ligand.

4. The lithium battery of claim 3, wherein the boron-based ligand comprises a pentafluorophenylboron.

5. The lithium battery of claim 4, wherein the boron-based ligand comprises an oxalate-based, malonic acid-based, or maleic acid-based pentafluorophenylboron.

* * * * *